United States Patent
Xu et al.

(10) Patent No.: US 8,965,140 B1
(45) Date of Patent: Feb. 24, 2015

(54) METHOD AND APPARATUS FOR ENCODING MIXED CONTENT IMAGE SEQUENCES

(75) Inventors: Zhan Xu, Richmond (CA); David Victor Hobbs, Surrey (CA)

(73) Assignee: Teradici Corporation, Burnaby, British Columbia (CA)

( * ) Notice: Subject to any disclaimer, the term of this patent is extended or adjusted under 35 U.S.C. 154(b) by 611 days.

(21) Appl. No.: 13/018,003

(22) Filed: Jan. 31, 2011

(51) Int. Cl.
*G06K 9/46* (2006.01)
*G06K 9/38* (2006.01)
*H04N 19/60* (2014.01)

(52) U.S. Cl.
CPC ... *G06K 9/38* (2013.01); *H04N 7/30* (2013.01)
USPC ............................. 382/244; 382/195; 382/273

(58) Field of Classification Search
CPC ........................................................ G04K 9/38
USPC .......................................................... 382/244
See application file for complete search history.

(56) References Cited

U.S. PATENT DOCUMENTS

| | | | |
|---|---|---|---|
| 6,269,484 B1 | 7/2001 | Simsic et al. | |
| 7,630,574 B2* | 12/2009 | Yamada | 382/273 |
| 8,229,238 B2* | 7/2012 | Matsumoto | 382/244 |
| 2003/0202699 A1* | 10/2003 | Simard et al. | 382/195 |
| 2004/0017939 A1 | 1/2004 | Mehrotra | |
| 2004/0225744 A1 | 11/2004 | Frossard et al. | |
| 2006/0233257 A1* | 10/2006 | Keith et al. | 375/240.19 |
| 2011/0227920 A1* | 9/2011 | Adams et al. | 345/426 |

OTHER PUBLICATIONS

"Using Checksum to Reduce Power Consumption of Display Systems for Low-Motion Content" Kyungtae Han, et al., Intel Labs, Hillsboro, OR, IEEE Conference, 2009, pp. 47-53.
"A Hybrid Thin-Client Protocol for Multimedia Streaming and Interactive Gaming Applications"; D. De Winter, P. Simoens, L. Deboosere, F. De Turck, J. Moreau, B. Dhoedt, and P. Demeester. 2006; In Proceedings of the 2006 International Workshop on Network and Operating Systems Support for Digital Audio and Video (NOSSDAV '06). ACM, New York, NY, USA, Article 15, 6 pages.
"Enhanced Layer Based Compound Image Compression"; D. Maheswari and V. Radha. 2010. In Proceedings of the 1st Amrita ACM-W Celebration on Women in Computing in India (A2CWiC '10). ACM, New York, NY, USA, Article 40, 8 pages.
"Enable Efficient Compound Image Compression in H.264/AVC Intra Coding"; W. Ding, Y. Lu, and F. Wu; IEEE International Conference on Image Processing, 2007, ICIP 2007, Sep. 2007, vol. 2, pp. II-337 to II-340, San Antonio, TX.

(Continued)

*Primary Examiner* — William C Vaughn, Jr.
*Assistant Examiner* — Luis M Perez
(74) *Attorney, Agent, or Firm* — Moser Taboada

(57) ABSTRACT

A method and apparatus for encoding a frame from a mixed content image sequence. In one embodiment, the method, executed under the control of a processor configured with computer executable instructions, comprises (i) generating, by an encoding processor, an image type mask that divides the frame into an unchanged portion, an object portion and a picture portion; (ii) producing lossless encoded content, by the encoding processor, from the object portion and the image type mask; (iii) generating, by the encoding processor, a filtered facsimile from the frame, the filtered facsimile generated by retaining the picture portion and filling the unchanged portion and the object portion with neutral image data; and (iv) producing, by the encoding processor, lossy encoded content from the filtered facsimile.

18 Claims, 8 Drawing Sheets

(56) References Cited

OTHER PUBLICATIONS

"Transcoding Method of H.264 Coded Bitstream for Interest Region"; Ya-lin Wu and Soon-kak Kwon; The International Journal of Virtual Reality, 8(3): 45-50, Sep. 2009. IPI Press, Co., USA.

"Using H.264/AVC—Intra for Segmentation-Driven Compound Document Coding"; A. Zaghetto, R. L. de Queiroz; IEEE International Conference on Image Processing (ICIP), 2007, vol. 2, pp. II-333-II-336, Sep. 2007 San Antonio, TX.

"Cloudlet-Screen Computing: A Multi-Core-Based, Cloud-Computing-Oriented, Traditional-Computing-Compatible Parallel Computing Paradigm for the Masses"; Tao Lin, Shuhui Wang; IEEE International Conference on Multimedia and Expo (ICME) 2009, pp. 1805-1808, Jun. 28, 2009. New York USA.

"Compound Image Compression for Real-Time Computer Screen Image Transmission"; T. Lin and P. Hao; IEEE Transactions on Image Processing, vol. 14, No. 8, pp. 993-1005, Aug. 2005.

"A Remote Thin Client System for Real Time Multimedia Streaming over VNC"; Kheng-Joo Tan, Jia-Wei Gong, Bing-Tsung Wu, Dou-Cheng Chang, Hsin-Yi Li, Yi-Mao Hsiao, Yung-Chung Chen, Shi-Wu Lo, Yuan-Sun Chu, Jiun-In Guo; IEEE International Conference on Multimedia and Expo (ICME) 2010, pp. 992-997, Jul. 19-23, 2010. Singapore.

"Compress Compound Images in H.264/MPGE-4 AVC by Exploiting Spatial Correlation"; Cuiling Lan, Guangming Shi, Feng Wu; IEEE Transactions on Image Processing, vol. 19, No. 4, pp. 946-957, Apr. 2010.

* cited by examiner

METHOD AND APPARATUS FOR ENCODING MIXED CONTENT IMAGE SEQUENCES

BACKGROUND OF THE INVENTION

1. Field of the Invention

Embodiments of the present invention relate generally to a method and apparatus for transferring an image sequence from a host system to a client communication endpoint. Specifically, an encoding processor at the host applies lossless and lossy encoding techniques to different portions of frames in the sequence such that commodity video decoder apparatus at the client is enabled to operate in tandem with a decoding processor to produce a client approximation of the image sequence for display.

2. Description of the Related Art

Commodity video decoders are available as hardware (i.e., tailored silicon) or software (i.e., machine executable instructions targeted for general purpose processors). Modern silicon implementations are compliant with well known standards such as H.264 and are generally low power and low cost. While such decoders may comprise a limited masked decoding capability (i.e., an ability to skip decoding sections of an encoded video image as defined by a mask), the mask is inaccessible for exploitation by external functions. While such decoders are well suited to processing relatively low contrast video images, they are poorly suited to processing high definition text content, such as parts of computer desktop display images.

In the field of combined lossless and lossy encoding techniques, various methods exist for encoding selective image parts of a video image e.g., indexed encoding (e.g., color cache techniques), PCM encoding as supported within H.264 or residual encoding, for example as supported by the H.264 High 4:4:4 profile, Such approaches generally require specialized decoder capabilities.

Presently available hybrid decoders can be configured to assemble a mixed content image stream by decoding different image types. These are generally software-oriented and therefore computationally inefficient, or hardware-oriented in which case reliant on complex proprietary processing structures, resulting in added cost to endpoints.

Therefore, there is a need in the art for a method and apparatus for encoding of a mixed content image sequence for communication to a client endpoint, making efficient use of communication resources. The architecture of such a client endpoint should be suited to economically attractive implementations.

SUMMARY OF THE INVENTION

Embodiments of the present invention generally relate to a method and apparatus for encoding a frame from a mixed content image sequence. In one embodiment, the method, executed under the control of a processor configured with computer executable instructions, comprises (i) generating, by an encoding processor, an image type mask that divides the frame into an unchanged portion, an object portion and a picture portion; (ii) producing lossless encoded content, by the encoding processor, from the object portion and the image type mask; (iii) generating, by the encoding processor, a filtered facsimile from the frame, the filtered facsimile generated by retaining the picture portion and filling the unchanged portion and the object portion with neutral image data; and (iv) producing, by the encoding processor, lossy encoded content from the filtered facsimile.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
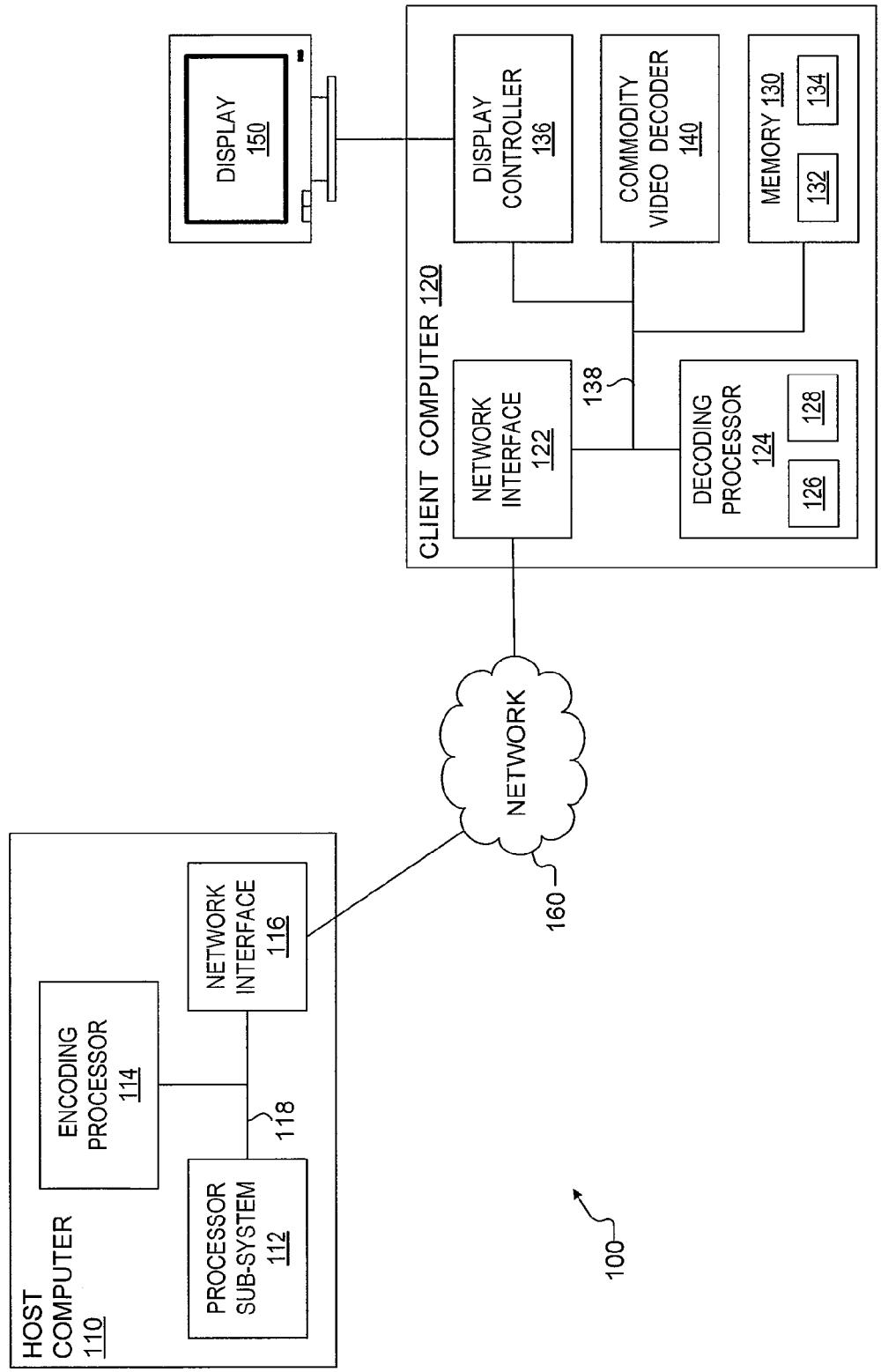
FIG. 1 illustrates selected details of an embodiment of a system comprising a host with an encoding processor connected to, and enabled to communicate with, a client communication endpoint comprising a decoding processor coupled to a commodity video decoder.

The invention may be implemented in numerous ways, including as a process, an article of manufacture, an apparatus, a system, and as a set of computer-readable descriptions and/or instructions embedded on and/or in a computer-readable medium such as a computer-readable storage medium. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The Detailed Description includes an Introduction to facilitate the more rapid understanding of the remainder of the Detailed Description. The invention encompasses all possible modifications and variations within the scope of the issued claims.

The term processor as used herein refers to any type of processor, central processing unit (CPU), microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

The term 'image sequence' as used herein refers to a chronological history of two dimensional pixel data sets, generally allocated to the same two dimensional memory buffer over a period of time.

The terms 'frame' or 'image frame' as used herein refer to a captured instance of the image sequence comprising a two dimensional set of pixel data.

The terms 'current frame' or 'current image frame' as used herein refer to the captured instance of the image sequence designated for encoding, typically the most recent frame available for encoding.

The term 'image portion' as used herein refers to part, or all, of one image frame of an image sequence.

The term 'unchanged portion' as used herein refers to the part of the current frame with pixel values unchanged since a previous encoding of the frame.

The term 'object portion' as used herein refers to the part of the current frame identified as suitable for lossless encoding techniques, generally due to the presence of high contrast detail and/or background color which is subject to significant degradation in perceived image quality if lossy encoding techniques are used.

The term 'picture portion' as used herein refers to the part of the current frame identified as suitable for lossy encoding techniques, generally due to the ability of the human visual system to tolerate lossy reproduction of images of this type without significant degradation in perceived image quality.

Introduction

In one or more embodiments of the present invention, a remote computing system, such as system 100 in FIG. 1, comprises a host computer coupled by a network to a client apparatus with a display. The host computer comprises a processor sub-system, such as a Central Processing Unit (CPU), associated system memory and optional Graphics Processing Unit (GPU). The processor sub-system executes an Operating System (O/S), driver software and application software such as word processor, spreadsheet application, Computer Aided Design (CAD) software, digital photo viewer, video player software or the like, optionally virtualized in a virtual machine. The application software (in conjunction with underlying O/S and drivers) produces a mixed content image sequence (i.e., an image sequence comprising content such as background, text, pictures and high detail objects), typically rendered as pixel values to one or more two-dimensional frame buffers in system memory. According to changes in display output of the various application software contributing to a display image (i.e., the image sequence), the entire frame buffer, portions of the frame buffer or individual pixels are updated with new pixel values as needed, usually at a frame update rate specified for a given processor sub-system.

Rather than, or in addition to, displaying the image sequence locally at the host computer, an encoding processor generates lossless encoded content from object portions of the current frame. The lossless encoded content includes identified object portions of the current frame (e.g., sections comprising a dominant background color, optionally behind high contrast image features). Following the generation of the lossless encoded content, a filtered facsimile of the current frame is generated and processed as a complete frame entity by a lossy video encoder to generate lossy encoded content. Areas of the current frame corresponding to the object portions and areas of the current frame identified as unchanged from a previous frame in the image sequence are filled with neutral data to produce the filtered facsimile of the current frame. The selection of neutral fill data in the filtered facsimile is based on the requirement to minimize the output bandwidth of the lossy video encoder associated with object data which has been encoded separately. The lossy video encoder uses a difference-based encoding algorithm such as H.264 in High Profile (HP) mode to encode the filtered facsimile. Both lossy and lossless encoded content are communicated over a network to the client apparatus where a commodity video decoder decodes the lossy encoded content, a decoding processor decodes the lossless encoded content and a composite frame is generated for display.

FIG. 1 illustrates selected details of an embodiment of an image sequence communication system 100 ("system 100") for remote display of a computer image. System 100 comprises a host computer 110, such as a personal computer, computer server, or the like, coupled to and enabled to communicate with one or more communication endpoints, such as client computer 120, by an Internet Protocol (IP) packet network 160. Client computer 120 is coupled to the display 150, alternatively termed 'monitor' 150. Other embodiments of system 100 comprise alternative communications endpoints, such as one or more image storage systems or various combinations of display and storage endpoints.

Host computer 110 ("computer 110") is, generally, a computer or system of computers that has been designated for running software associated with one or more communication endpoints, such as user interfaces associated with the client computer 120; wherein the software associated with an endpoint comprises operating system, driver software, and application software with display presentation requirements. In an embodiment, computer 110 comprises processor sub-system 112 coupled to encoding processor 114 and network interface 116 by one or more bus structures (i.e., interconnect 118), such as memory and/or I/O busses known to the art.

In various embodiments, processor sub-system 112 comprises one or more CPUs, one or more GPUs, or a combination of CPU and GPU processing elements communicatively coupled to computer memory and peripheral device interfaces (e.g., Universal Serial Bus (USB), audio and Peripheral Component Interconnect (PCI)) using various well known elements such as north bridge, south bridge, power supplies, clock circuits, data registers, I/O interfaces, and other support circuits including at least one of address, control, interrupt and/or data connections, controllers, data buffers, drivers, repeaters, and receivers to enable appropriate communications between the elements of host computer 110. Examples of a well known suitable CPU include mobile, workstation or server class processors such as 32-bit, 64-bit or other CPUs including OPTERON, ATHLON or PHENOM class microprocessors manufactured by AMD Corporation; XEON, PENRYN, PENTIUM or X86 class processors manufactured by INTEL; or SPARC microprocessors manufactured by ORACLE Inc. However, other microprocessor platform enabled to generate the image sequence described herein may be utilized. Memory of processor sub-system 112 comprises any one or combination of volatile computer readable media (e.g., random access memory (RAM), such as dynamic random access memory (DRAM), static random access memory (SRAM), extreme data rate (XDR) RAM, Double Data Rate (DDR) RAM, and the like) and nonvolatile computer readable media (e.g., ROM, hard drive, tape, CDROM, DVDROM, magneto-optical disks, Erasable Programmable Read-Only Memory (EPROM), Electrically Erasable Programmable Read-Only Memory (EEPROM), Flash EPROM, and the like). Moreover, processor sub-system memory may incorporate electronic, magnetic, optical, and/or other types of storage media. In an exemplary embodiment, the memory of processor sub-system 112 stores executable software in the form of machine-readable instructions utilized to control encoding processor 114 and network interface 116 in addition to components not depicted in FIG. 1, such as application software, operating system components, drivers, administrative software and the like. According to various embodiments, interconnect 118 is, for example but not limited to, one or more buses such as a Peripheral Component Interconnect (PCI) bus, a PCI-EXPRESS bus, a HYPERTRANSPORT bus, a memory bus, a virtualized system bus, or other wired, optical or wireless connections, as is known in the art.

Figure 2:
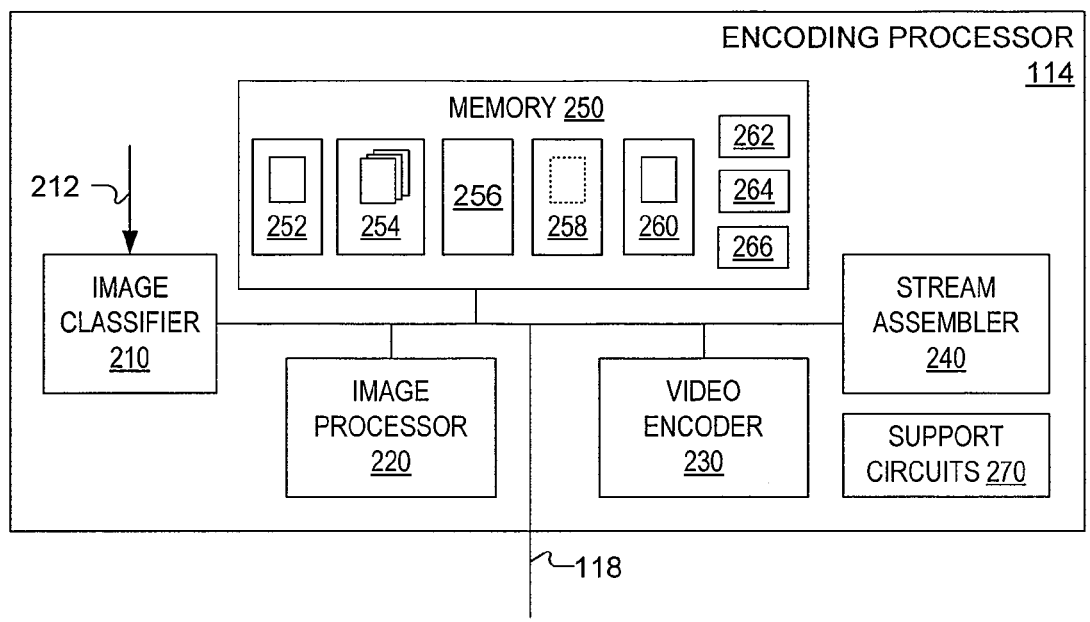
FIG. 2 illustrates selected details of an embodiment of an encoding processor enabled to encode a mixed content image sequence.

Encoding processor 114, an embodiment of which is depicted in FIG. 2, comprises image classification, image processing, video encoding, stream assembly and memory resources for encoding image frames generated by processor sub-system 112 using various encoding methods described herein. In some embodiments, encoding processor 114 is implemented as part of a processor, such as part of an Application Specific Integrated Circuit (ASIC), Field Programmable Gate Array (FPGA) or embedded processor configured, at least in part, as a logic circuit to perform image encoding; other processors and/or electronic hardware suitable for performing image encoding; or any combination of the foregoing. In other embodiments, encoding processor 114 is implemented, at least in part, as a set of machine executable instructions stored in memory associated with processor sub-system 112 and executed by a processing resource (such as a CPU of processor sub-system 112), or memory associated with encoding processor 114 and executed by a processing resource of encoding processor 114.

In an embodiment, network interface 116 provides compatibility with the network 160 by executing a reliable protocol stack such as TCP/IP and/or best efforts protocol stack such as UDP/IP. In addition to enabling the communication of encoded image content, the network interface 116 provides information relating to network components, such as network capacity, communications statistics, or bandwidth availability information, to encoding processor 114. In one or more embodiments, the network interface 116 is coupled to a system bus of processor sub-system 112 or coupled directly to encoding processor 114, for example co-located with encoding processor 114 on a System on Chip (SoC) device.

The network 160 comprises a communication system (e.g., the Internet, local area network (LAN), wireless LAN, wide area network (WAN), and the like) that connects computer systems completely by wire, cable, fiber optic, and/or wireless links facilitated by various types of well-known network elements, such as hubs, switches, routers, and the like. In one embodiment, the network 160 may be a shared packet switched network that employs various well-known protocols (e.g., TCP/IP and the like) to communicate information amongst the network resources. For example, in various embodiments, the network 160 employs part of the Internet.

Client computer 120 is generally any form of computing device that can connect to network 160 and execute the image decoding techniques described herein. For example, in an embodiment, client computer 120 is a terminal in a networked computer system (e.g., in an embodiment, system 100 is a remote computing system). Such remote terminals include zero clients, thin clients, personal computers, workstations, tablets, wireless devices or smart phones, storage systems and the like. In other embodiments, client computer 120 also comprises one or more peripheral devices such as a mouse, keyboard and/or other well known peripherals not shown in FIG. 1, and computer 120 presents a remote Graphical User Interface (GUI) on display 150. Display 150 is any screen type device (e.g., liquid crystal display (LCD), cathode ray tube (CRT), or the like) that displays images. In some embodiments, the client computer 120 connects to a plurality of displays, for example using display connections such as Video Graphics Adapter (VGA) Digital Visual Interface (DVI) or DisplayPort connections.

In the embodiment of FIG. 1, client computer 120 comprises network interface 122 coupled to various elements including decoding processor 124, memory 130, commodity video decoder 140 (or "video decoder" 140), and display controller 136 by bus 138, such as a system bus. In an embodiment, bus 138 comprises one or more of: a Peripheral Component Interconnect (PCI) bus; a PCI-Express™ bus; an Advanced Microprocessor Bus Architecture (AMBA®) bus; or any other connections, including wired, wireless, and optical connections, for coupling components of client computer 120. Network interface 122 provides compatibility with network 160 by providing one or more network connections (such as TCP/IP and/or UDP/IP sockets) for receiving encoded image content and exchanging communications related to configuration, management and control functions. Network interface 122 may comprise well known hardware acceleration facilities for efficient execution of networking protocols and packet encryption functions. Decoding processor 124 comprises stream dis-assembler 126 for disassembling encoded content received from computer 110 into encoded video frames, encoded selective image updates and a client mask. Selective decoder 128 decodes the encoded selective image updates, typically comprising encoded lossless content and provides updates to locations of composite image frame 134 indicated by the client mask.

Video decoder 140 is an independent video stream processing resource, such as a hardware optimized video decoder, under control of decoding processor 124 separated by a communication bus 138. Video decoder 140 is generally intended for decoding standards based videos which might be decoded and played on a consumer computer, such videos comprising a constant size frame. Alternatively, video decoder 140 comprises optimized video decoding software executed by a suitable processor. In an embodiment, video decoder 140 comprises structural optimizations, such as parallel data processing features including separate blocks for transform processing, intra-prediction and entropy decoding, using a shared control/communication bus infrastructure and a memory sub-system to allow for power efficient decoding of a plurality of video stream formats, including 1080p24 H.264 High Profile (HP) mode. Other such structural optimizations may include sub-systems enabled for filtering and motion compensation. Such a standards based video decoder 140 is generally neither enabled to decode video content of a dynamic frame size nor masked video content in which the mask identifies sections of the image in which encoded image data is not provided on a frame by frame basis, Neither does video decoder 140 provide an accessible mask which can be utilized. In the absence of encoded image data being provided on a frame by frame basis, to combine the output of video decoder 140 with image content generated by other decoder resources. i.e., video decoder 140 may be termed a maskless constant frame size video decoder.

Video decoder 140 is configured to generate updated video frame 132, generally comprising a frame size equal to the pixel resolution of one or more attached display apparatus, such as display 150, by decoding disassembled encoded video frames. Decoding processor 124 provides means such as DMAC resources and memory access facilities for copying portions of the updated video frame 132 to the composite image frame 134, also in accordance with locations indicated by the client mask. Display controller 136 uses well known techniques to communicate the composed composite image frame 134 to display 150.

FIG. 2 illustrates an embodiment of encoding processor 114 enabled to encode a mixed content image sequence. Image classifier 210, image processor 220, video encoder 230 and stream assembler 240, which are each communicatively coupled to memory 250, may be implemented in hardware (e.g., as part of an SoC or FPGA) or as software functions executed by an embedded microcontroller or microprocessor, such as a Reduced Instruction Set Computer (RISC) processor, an Advanced RISC Machine (ARM), Microprocessor without Interlocked Pipeline Stages (MIPS), or another type of embedded processor of encoding processor 114 or a CPU or GPU element of processor sub-system 112. The coupling may comprise an extension of bus 118 and/or additional bus structures (e.g., AMBA bus) or well known memory-based data structures to facilitate communications. The memory 250 comprises random access memory, such as Dynamic Random Access Memory (DRAM), synchronous DRAM or video DRAM, read only memory, removable disk memory, flash memory, and various combinations of these types of memory. In some embodiments, at least part of memory 250 may be external to encoding processor 114, for example coupled by a memory bus. In other embodiments, at least part of memory 250 is attached to a resource such as a CPU or GPU element of processor sub-system 112. Support circuits 270 generally comprise at least one of clock circuits, I/O interfaces, address, control, interrupt and/or data connections, controllers, data buffers, drivers, repeaters, receivers or Direct Memory Access Controller (DMAC) resources to facilitate the communication of data structures, such as image updates between memory 250 and elements of encoding processor 114 or processor sub-system 112. In some embodiments, support circuits 270 comprise microcontroller or microprocessor resources suited to executing machine-readable instructions associated with functions of encoding processor 114.

Figure 4:
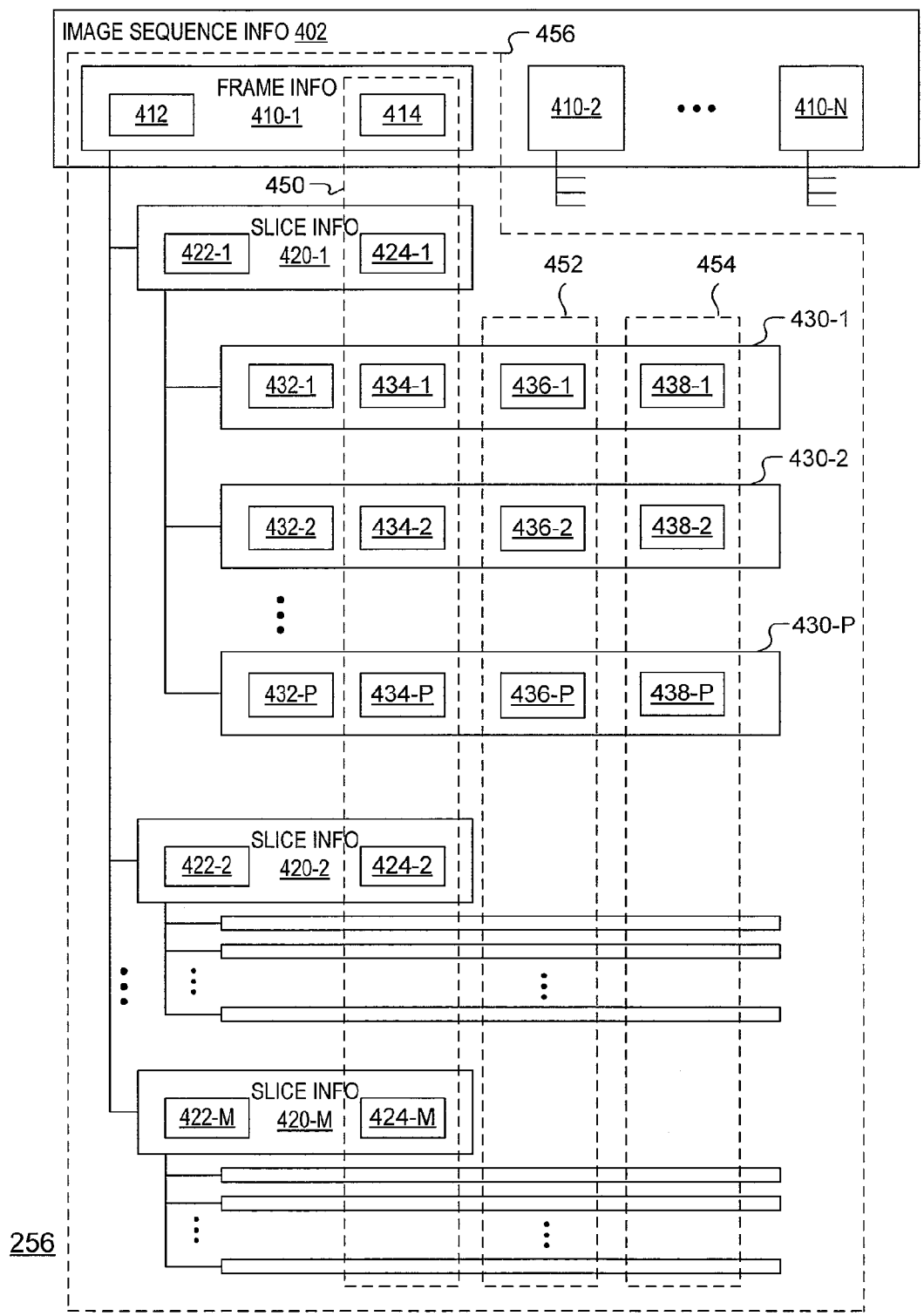
FIG. 4 illustrates selected details of an embodiment of a mask associated with an image sequence.

Image frame 252 (also referred to as "frame 252") generally originates from processor sub-system 112 and may be copied to memory 250 for classification or processed in place at sub-system 112. In an embodiment, image classifier 210 partitions frame 252 into blocks, such as rectangular blocks comprising 4×4, 8×8 or 16×16 pixels to enable independent processing of individual blocks. In other embodiments frame 252 is partitioned into blocks or other image sections according to current or historic metadata structures (such as windows, borders and/or content regions defined by software applications) or irregular shapes (such as rectangles of different sizes). Image classifier 210 identifies different image types using hints provided by processor sub-system 112 and/or spatial and temporal analysis of pixel values, for example by processing the blocks using pixel-oriented filters tuned to analysis of image characteristics such as contrast, color content or other suitable parameters. The classification of frame 252 divides the frame into various portions, including an unchanged portion, an object portion (e.g., a constant color background or text font pixels on a constant color background) and a picture portion (e.g., low contrast content displayed by a video player software application), each portion typically comprising multiple regions of frame 252 of the particular unchanged, object or picture image type. These image type attributes (e.g., unchanged, object, picture) are indicated in designated locations of a mask 256 as part of an image type mask pertaining to frame 252. Additionally, the mask 256 may comprise image type masks pertaining to one or more previous image frame. An embodiment of the mask 256 is depicted in FIG. 4.

Determination of such image type attributes is facilitated by information 212, such as a pixel change map (i.e., a "dirty mask") that indicates regions of updated pixel values; metadata such as descriptors providing identification of text type (e.g., document regions), video type (e.g., regions under control of a video player) or picture type (e.g., regions under control of an image viewer) within frame 252; motion information or other hints such as display refresh rate, window manager state information, current draw state information or other details derived from drawing commands provided by processing sub-system 112.

Figure 3:
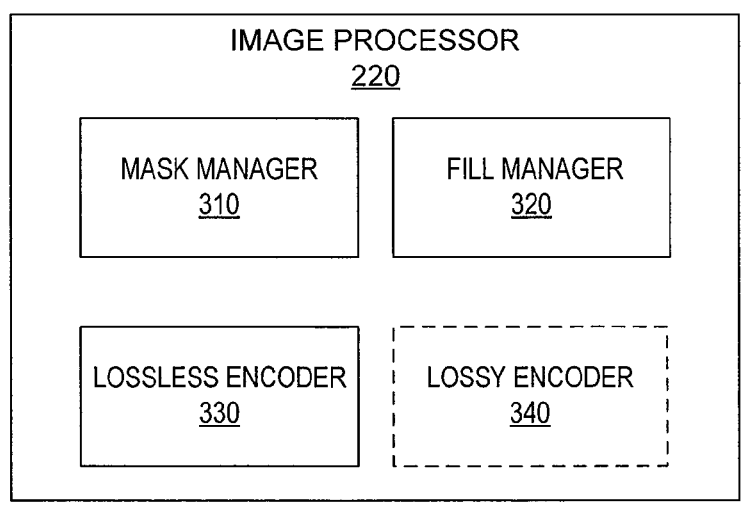
FIG. 3 illustrates selected details of an embodiment of an image processor that executes various methods and encoding functions.

Image processor 220, an embodiment of which is depicted in FIG. 3, provides functions for generating and managing mask 256 and generating filtered facsimile 258 from frame 252. Image processor 220 also provides a lossless encoder for generating lossless encoded content 262 from mask information pertaining to frame 252 and described in detail below with respect to FIG. 4. Such mask information includes font pixel data and masks for object portions of frame 252. In some embodiments, image processor 220 is further enabled to perform progressive encoding techniques, such as progressive Discrete Wavelet Transforms (DWT) encoding of picture portions of frame 252 identified as unchanged for a defined period of time; such high quality lossy encoding methods provide increased quality (e.g., YUV 4:4:4 color format) over formats supported by commodity video decoder 140 (e.g., YUV 4:2:0 color format). In such an embodiment, image processor 220 maintains state information 266, including current encoding parameters (e.g. quality settings) and timing information, associated with unchanged blocks or regions of frame 252. State information 266 may also comprise state history information, such as output bandwidth values (i.e., size information pertaining to content 262 and/or 264) associated with one or more previous frames. Such state history may be used in aiding the determination of whether a block is classified as picture type or object type.

Video encoder 230 is enabled to execute a lossy video encoding algorithm, such as H.264/MPEG4 Part 10 from the ITU-T Video Coding Experts Group, that generates lossy encoded content 264. Lossy encoded content 264 meets format requirements of an unmasked constant frame size video decoder, such as video decoder 140 operated in H.264 High Profile (HP) mode. Such a lossy video encoding technique is implemented by comparing an input frame (i.e., filtered facsimile 258) to a video reference frame 260 (generated by video encoder 230) and encoding the difference data resultant from the comparison. In an embodiment, generation of a new video reference image 260 for the next frame (generated by video encoder 230 utilizing a decoded version of a previously encoded frame 258) is delayed to maintain synchronization between video reference images of encoder 230 and decoder 140. In some embodiments, video reference image 260 comprises the latest video reference image in addition to a set of historic reference frames that enable video encoder 230 to access reference image data from earlier frames. Such an embodiment generally mandates that video decoder 140 maintains an equivalent set of reference frames in memory 130.

Stream assembler 240 is enabled to assemble an encoded image stream comprising the lossless encoded content 262 (generated by image processor 220) and the lossy encoded content 264 (generated by video encoder 230) into a sequence of network frames for communication to client computer 120. If a best-efforts network protocol such as UDP/IP is utilized, frame headers comprise sequence information (i.e., ordering) that enables reordering at client computer 120 and retransmission of lost packets if desired. In an embodiment, lossless and lossy content associated with the same current image frame 252 are synchronized within the image stream to prevent tearing artifacts in composite image frame 134.

In some embodiments, at least part of frame 252, lossless encoded content 262 and/or filtered facsimile 258 is maintained as previous frame data 254 to provide fill data for future filtered facsimile frames. In an embodiment, different pixel blocks from image frame 252 are assigned unique signatures (e.g., hash codes derived from the pixel value makeup of the block). Previous frame data 254 stores a history of signatures associated with current and previous frames to enable caching of an equivalent history of signatures in conjunction with the pixel blocks themselves in memory 130 of client computer 120.

Memory 250 may also store other data structures not depicted in FIG. 2, including intermediate encoding results and state information (e.g., quantization state for blocks of filtered facsimile 258 or video reference 260), registers and machine-readable instructions associated with the execution of image encoding operations. In some embodiments, memory 250 stores one or more DMA transfer lists executed by DMAC resources to copy image content and/or information 212 from processor sub-system 112 to memory 250, copy data between the various data structures of memory 250, and move assembled frames to network interface 116.

FIG. 3 illustrates selected details of an embodiment of an image processor 220 that executes various methods and encoding functions. Mask manager 310 generates mask 256 in addition to managing the update of image sequence information, frame information, image type mask information, image change mask information and font pixel information in the mask. In some embodiments, mask manager 310 is enabled to execute image processing algorithms, such as dilation and erosion on an image type mask following initial image classification and encoding prediction. By defragmenting picture and object portions of the image frame, small isolated sections comprising one image type are eliminated and overall encoding efficiency improved.

Fill manager 320 copies the picture portion of image frame 252 to filtered facsimile 258 and fills object and unchanged portions of image frame 252 with neutral image data (also referred to as neutral data or neutral fill data). Neutral data is selected such that network bandwidth associated with lossy encoded content 264, generated by video encoder 230 from filtered facsimile 258, is minimized (i.e., the size of the lossy encoded content 264 is minimized), since the portion of image frame 252 identified as object type is explicitly designated for separate lossless encoding. While the High 4:4:4 profile (H444P) of the H.264/MPEG-4 AVC video standard allows lossless encoding of designated blocks by a capable video encoder, such an approach is incompatible with commodity video decoders, such as video decoder 140. Fill manager 320 utilizes mask 256 to identify which unchanged section and object sections of frame 252 designated by image classifier 210 are suitable for fill. Various fill strategies are described in process 500 below.

Lossless encoder 330 comprises at least one of a Golomb encoder, Rice encoder, Huffman encoder, variable length encoder (VLC), context-adaptive VLC Lempel-Ziv-Welch (LZW) encoder or context-adaptive binary arithmetic encoder (CABAC)) suited to lossless encoding of object images and mask 256 which typically includes font pixel data. In some embodiments, lossless encoder 330 is enabled for residual encoding of unchanged image sections, previously designated as picture image type.

In some embodiments, image processor 220 comprises lossy encoder 340 to provide lossy encoding services independent of video encoder 230. In once case, lossy encoder 340 enables lossy encoding of pixels defined by image features such as window edges rather than pre-defined block-oriented segmentation. In another case, lossy encoder 340 provides high quality progressive wavelet or alternative progressive transform encoding of unchanged picture areas suited to generate an image of a higher quality specification than the quality specification of images regenerated by video decoder 140 which may be constrained by processing capabilities of the video decoder itself. In an embodiment, lossy encoder 340 comprises one or more independent lossy encoders, such as at least one of a lossy pixel encoder, wavelet encoder, a DCT encoder, or a JPEG encoder.

FIG. 4 illustrates an embodiment of mask 256 associated with an image sequence. Image sequence information 402 comprises frame information 410-1 pertaining to the current image frame 252, frame information 410-2 pertaining to the previous image frame, and other historic frame information including frame information 410-N comprising information related to the oldest frame in the sequence. Generally, image sequence information 402 is retained for a specified number of sequential frames or according to memory availability and useful lifespan of image mask information, the current frame information replacing the oldest stored frame information once the maximum number of frames in the history is reached.

Frame information 410-1 comprises a frame identity 412, such as a sequence number, and frame change state 414, typically comprising a binary indication to identify if current image frame 252 is changed. In an embodiment, a frame is designated as "changed" if any pixel in the frame has changed. In the embodiment of FIG. 4, a frame is demarcated into sequential slices of a pre-specified number of sequential pixel rows (e.g., 64 rows) across the entire frame, each slice comprising a series of 16×16 macro-blocks (i.e., the frame 252 is demarcated into four rows of macro-blocks, each macro-block further segmented into four blocks of 8×8 pixels). Other embodiments demarcate frame 252 into image sections such as slices, macro-blocks, blocks or rectangles of one or more sizes based on alternative hardware architectures for image processor 220, or based on hints from processor sub-system 112 or based on predicted image features determined from a frame pre-processing step. Slice information 420 for the current image frame 252 comprises slice information 420-1 designated to the first slice in the current image frame 252 (e.g., the top strip of the image frame 252), slice information 420-2 designated to the second slice in the current image frame 252 and so on, with slice information 420-M designated to the final slice in the current image frame 252. Slice information 420 comprises slice identifier 422 (depicted as slice identifiers 422-1, 422-2 and 422-M in FIG. 4) and slice change state 424 (depicted as slice change state 424-1, 424-2 and 424-M in FIG. 4), the slice change state 424 typically comprising binary indicia of slice change status. In an embodiment, a slice is designated as "changed" if any pixel in the slice has changed. In some embodiments, slice information 420 may comprise additional state information, such as present quality level used by a progressive encoder such as lossy encoder 340.

Block information 430 (depicted as block information 430-1, 430-2 and 430-P in FIG. 4) for each block in the slice comprises a block identifier 432 (depicted as block identifiers 432-1, 432-2 and 432-P in FIG. 4) and block change state 434 (depicted as block change state 434-1, 434-2 and 434-P in FIG. 4), the block change state 434 typically comprising binary indicia of block change status. In an embodiment, a block is designated as "changed" if any pixel in the block has changed. In select embodiments, state duration information is also maintained to track the period of time that a block remains in an unchanged state, utilized to increase the quality of static picture areas if desired. Block information 430 also comprises image type information 436 (depicted as image type information 436-1, 436-2 and 436-P in FIG. 4) and font pixel data 438 depicted as font pixel data 438-1, 438-2 and 438-P in FIG. 4). In an embodiment, changed blocks are depicted as being of object or picture image type, and blocks of object image type comprise font pixel information pertinent to lossless encoder 330. In an embodiment, font pixel data 438 for a block comprises a set of data values, categorized into logical groups to facilitate efficient lossless encoding. A suitable set of logical groups comprises a) a background color (e.g. expressed as an RGB color), b) a text mask comprising a pixel map that identifies text pixels in the block, and c) text color information expressed as a set of separated R, G and B components identified by the text mask. In some embodiments, font pixel data 438 comprises additional predictive information pertinent to the encoding algorithm of lossless encoder 330, such as indicia of a background color match with neighboring blocks. The indicia are utilized by encoder 330 but not necessarily in themselves encoded. In some embodiments, select image blocks or sections of object type may be sub-classified as images of either text type or high quality picture (i.e., non-text) type to support lossless encoding of designated text in conjunction with lossy encoding of designated objects.

Mask 256 may be logically defined to incorporate various sub-masks including hierarchical change mask 450, block type mask 452 and font pixel mask 454. In an embodiment, the image type mask 456 for the current frame comprises the child mask data associated with frame information 410-1. In alternative embodiments, mask information for each frame may be configured to support arbitrarily-located window-oriented image regions, sections or areas rather than sequential slices, for example defined by co-ordinates for each window in the frame. Windows may be overlapped with the mask used to store the composition state to determine visible areas. Such a mask is useful in a visual windows-based user interface environment in which a software embodiment of encoding processor 114 operates on image surfaces prior to final image composition.

Figure 5:
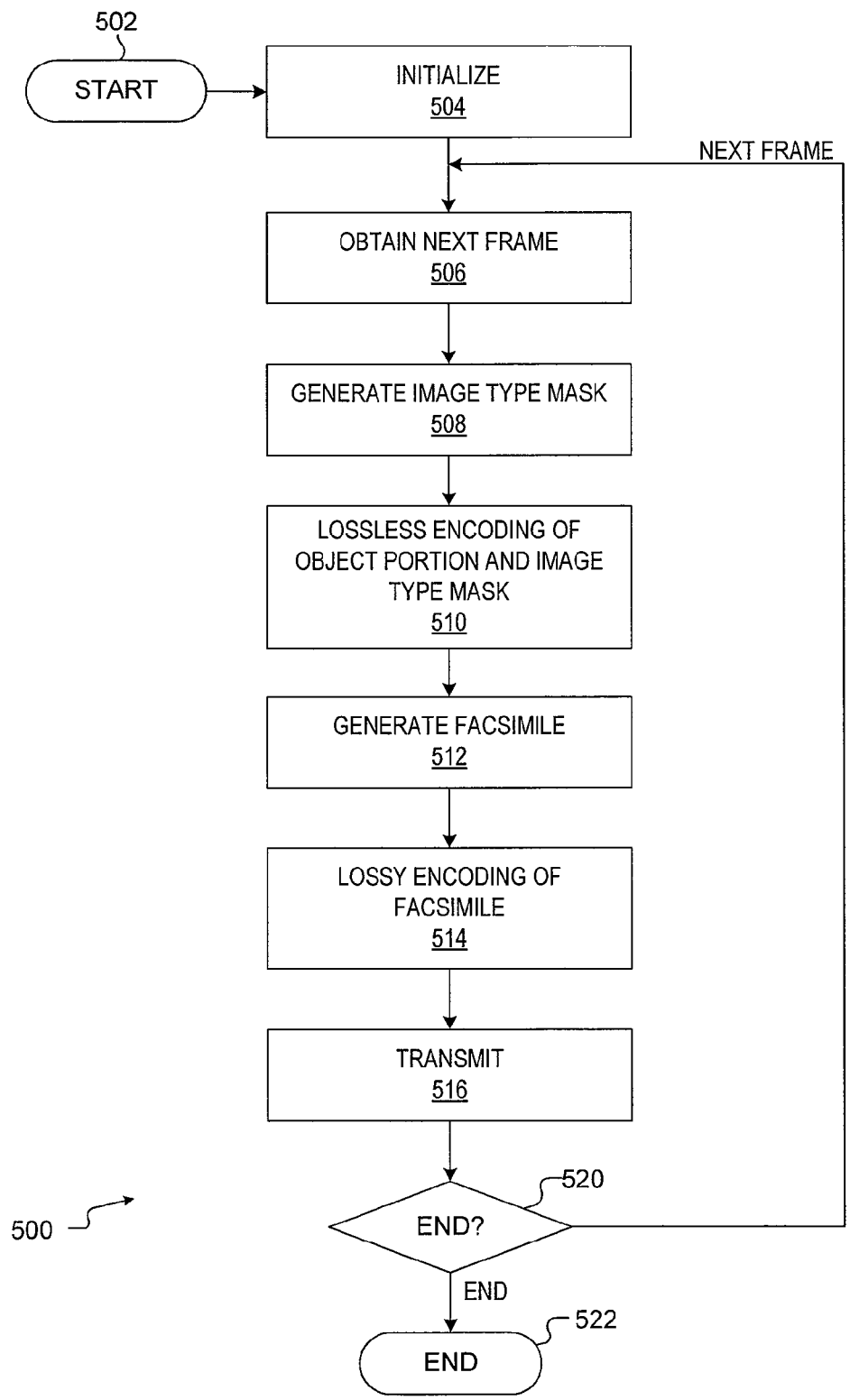
FIG. 5 illustrates selected details of an embodiment of a process for encoding and transmitting a mixed content image frame from a host computer to a client computer.

FIG. 5 illustrates an embodiment of a process 500 for encoding and transmitting a mixed content image frame, such as frame 252, from host computer 110 to client computer 120.

Process 500 starts ("Start" 502) and proceeds to step 504 ("Initialize"). According to various embodiments, step 504 comprises determining the common capabilities of video encoder 230 and video decoder 140, and negotiating a profile accordingly (e.g., HP, HOOP, or the like), including selection of attributes such as number of reference frames supported by the system. Data structures, including previous frame data 254, mask 256, video reference frame 260, and other intermediate data utilized by encoding processor 114, are initialized. Pixel change maps are typically initialized to reflect that the initial frame comprises no unchanged image portions. In an embodiment, a determination is made regarding the accessibility of reference frame 260 to fill manager 320. If accessible, decoded video reference image data is available to be copied to filtered facsimile 258 as neutral fill. Alternatively, a data structure is initialized to support use of image data from a previous image frame as neutral fill.

Process 500 proceeds to step 506 ("Obtain Next Frame") in which the most recent frame generated by processor sub-system 112 is captured. In an embodiment, changed areas of the most recent frame, as indicated by a pixel change map, are copied to frame 252, optionally facilitated by a DMA controller. In some embodiments, the current draw state of processor sub-system 112 is monitored by encoding processor 114 to prevent the capture and encoding of partially drawn image regions which results in visible display tearing artifacts. In some such embodiments, the optimum time to perform image copy operations is determined by recognizing drawing completion commands, such as completion of OpenGL "Swapbuffer" or "Flushbuffer" commands. Draw state for off-screen buffers, windowed image areas or other defined pre-composed image buffers is determined by recognizing the completion of canonical commands such as window updates. In other embodiments, a function of encoding processor 114 determines update rates for an image frame, window or other region of a display image by tracking the temporal frequency of image updates by processor sub-system 112. In other embodiments, a GPU of processor sub-system 112 generates a vertical sync signal (VSYNC) which is distributed via information 212 and used as a time base. In still other embodiments, a desired display refresh rate for display 150 is determined (for example by determining the display attributes) and used to specify the timing interval of an emulated local VSYNC interrupt. In a select embodiment, client computer 120 generates a display timing signal and display timing information is communicated back to encoding processor 114 so that image capture can be timed to meet the remote timing requirements. In yet other embodiments, audio timing is extracted from audio software associated processor sub-system 112 to enable alignment between frame capture timing and audio signals to ensure lip synchronization for video content.

Process 500 proceeds to step 508 ("Generate Image Type Mask") in which changed portions of frame 252 are classified as either object type or picture type in mask 256, thereby dividing the frame 252 into an unchanged portion, a picture portion and an object portion. The frame 252 is partitioned into logical segments or image sections, (e.g., blocks), and each image section is classified as an image type of unchanged, picture, or object type. Image sections or blocks are assigned to the unchanged portion based on change information such as information 212 (e.g., a pixel change map) received from processor sub-system 112 or a frame comparison function of encoding processor 114. In an embodiment, changed image blocks are classified as object type based on the detection of an image background comprising a constant color. As an example, the detection of a threshold number of pixels of an identical common color (i.e., matching value for each of Red, Green and Blue color components) within a block is used to determine that the block comprises a constant color background and the block is therefore assigned to the object portion of frame 252. As another example, the detection of a threshold number of pixels of limited deviation from a common color within a block is used to determine that the block is of object type. Other embodiments use more complex threshold determinations to more accurately predict the cost associated with lossless encoding of a block prior to classification. In one embodiment, normalized scores are generated for each of several image characteristics, including a) the number of unique colors, b) the number of pixels of the dominant color, c) the background gradient as provided by a smoothness filter, d) block contrast as provided by an edge detection filter, and e) background characteristics of west block (immediate left) and north block (immediately above) neighbors. Each normalized score is weighted to reflect the significance of the image characteristic in terms of bandwidth cost and/or image processing cost, the presence of irregular edges and many colors generally increasing the bandwidth cost. The sum of weighted scores is compared against a threshold to determine the resultant classification of the block. In an embodiment, the relative weighting of normalized scores is adjusted according to predicted available bandwidth, available image processing resources, or the cost (i.e., bandwidth consumed or processing resources utilized) for encoding a previous image slice or frame in order to tune bandwidth and/or processing resource utilization. Changed blocks that don't meet criteria for object blocks (e.g., no constant color background) are assigned to the picture portion of frame 252. The mask 256 is created by indicating the image type attributes in designated locations of the mask. An embodiment of step 508 is depicted as process 600 in FIG. 6.

Process 500 proceeds to step 510 ("Lossless Encoding of Object Portion and Image Type Mask") wherein lossless encoder 330 encodes the object image portion of frame 252 and the current image type mask in mask 256 to produce lossless encoded content 262. In an embodiment, each object block within the object image portion of frame 252 is logically organized as i) a color (i.e., a background color pixel value) of the detected constant color background, and ii) a font pixel mask that identifies locations of pixels in the block that don't match the background color. Then the background color pixel value, the font pixel mask and the values of pixels identified by the font pixel mask are encoded to produce lossless content.

Process 500 proceeds to step 512 ("Generate Facsimile") in which mask manager 310 copies the picture portion of frame 252 to corresponding frame locations in filtered facsimile 258. The unchanged portion and object portion of frame 252 are filled with neutral data in the corresponding locations of filtered facsimile 258 to minimize the lossy encoded data generated by encoding these areas. In an embodiment in which pixels from the video reference frame 260 are accessible, sub-portions (e.g., block-level granularity) of the video reference frame 260 are copied from the video reference frame 260 to corresponding locations in the filtered facsimile 258 that have changed from picture type to object type. In an embodiment in which the reference image (i.e., the video reference frame 260) may not be accessible, pixels used in the encoding of a previous frame are stored as part of previous frame data 254 and retrieved for use as neutral fill data when the block becomes unchanged. In another embodiment, average or median colors for blocks of picture image type are stored as part of previous frame data 254 and retrieved when the block becomes unchanged or changes to object type. In a further embodiment, a neutral "DC" color that generates minimal encoded data, such as neutral grey, is used to fill select object areas (i.e., a sub-portion) if a video reference image 260 is inaccessible. In some embodiments in which video encoder 230 and video decoder 140 are enabled to skip processing of select blocks, fill manager 320 provides video encoder 230 with a specification of unchanged or object blocks that should be skipped during video encoding. In an embodiment in which a de-blocking filter associated with video encoder 230 is active, the color of the neutral fill for blocks bordering a picture portion are approximately matched with that of their neighboring picture blocks to constrain bleeding effects of the neutral fill area into the picture area. For efficient video coding of the neutral region, a single neutral fill color should be used as a match against a border region rather than using a selection of neutral fill colors in such a case. A threshold test that identifies significant color changes in the picture portion may be used to trigger an update in color to such border blocks without generating excessive encoded content. As another example, filled locations of filtered facsimile 258 associated with an unchanged portion designated for an increase in image quality (using lossless encoder 330 or lossy encoder 340) are filled with neutral image data retrieved from the corresponding location in the video reference frame 260, derived from previous encoding of the filtered facsimile 258 before the area was identified as unchanged. Similarly, filled locations of filtered facsimile 258 associated with an object portion designated for lossless encoding (using lossless encoder 330) are filled with neutral image data retrieved from the corresponding location in the video reference frame 260, derived from previous encoding of the filtered facsimile 258 before the area was identified as comprising images of object type. Similarly, filled locations of filtered facsimile 258 associated with a high quality picture portion (i.e., a non-text portion) designated for high quality lossy encoding (using lossy encoder 340) are filled with neutral image data retrieved from the corresponding location in the video reference frame 260, derived from previous encoding of the filtered facsimile 258 before the area was identified as comprising images of a high quality picture type.

In an embodiment, bandwidth associated with lossy encoded content 264 is regulated by filling part of the unchanged portion with corresponding data from the video reference frame 260 and adjusting quality settings of encoding processor 114. For example, by adjusting quality settings associated with video encoder 230 for the parts filled with video reference data, such filled parts are predicted to contribute a corresponding change in lossy encoded content in a subsequent encode operation (i.e., the selection of pixels not requiring an increase in encoding quality is determined by the quality settings).

Process 500 proceeds to step 514 ("Lossy Encoding of Facsimile") in which video encoder 230 encodes filtered facsimile 258 to produce lossy encoded content 264. In an embodiment, the lossy encoded content 264 meets H.264 HP format requirements of an unmasked constant frame size video decoder. If image processor 220 provides caching services (e.g., by maintaining a list of block signatures associated with previous image frames), image processor 220 may provide video encoder 230 with motion hints to improve search efficiency. In once case in which video encoder 230 maintains multiple reference frames, image processor 220 provides an indication of reference frames that contain blocks that match image frame 252. In some embodiments, the de-blocking filter function of video encoder 230 is disabled at boundaries of the picture portion of filtered facsimile 258 during encoding.

Process 500 proceeds to step 516 ("Transmit") in which encoded content 262 and 264 are encapsulated in UDP/IP or TCP/IP frames and transmitted to client computer 120. Synchronization is maintained between the encoded content 262 and 264 to ensure concurrent decoding of lossless and lossy content associated with a particular image frame 252 to prevent tearing artifacts on display 150.

Process 500 proceeds to decision step 520 ("End?") where a determination is made as to whether process 500 repeats by obtaining and processing the next frame at step 506 or whether process 500 proceeds to step 522 ("End"), for example on termination of a remote computing session.

Figure 6:
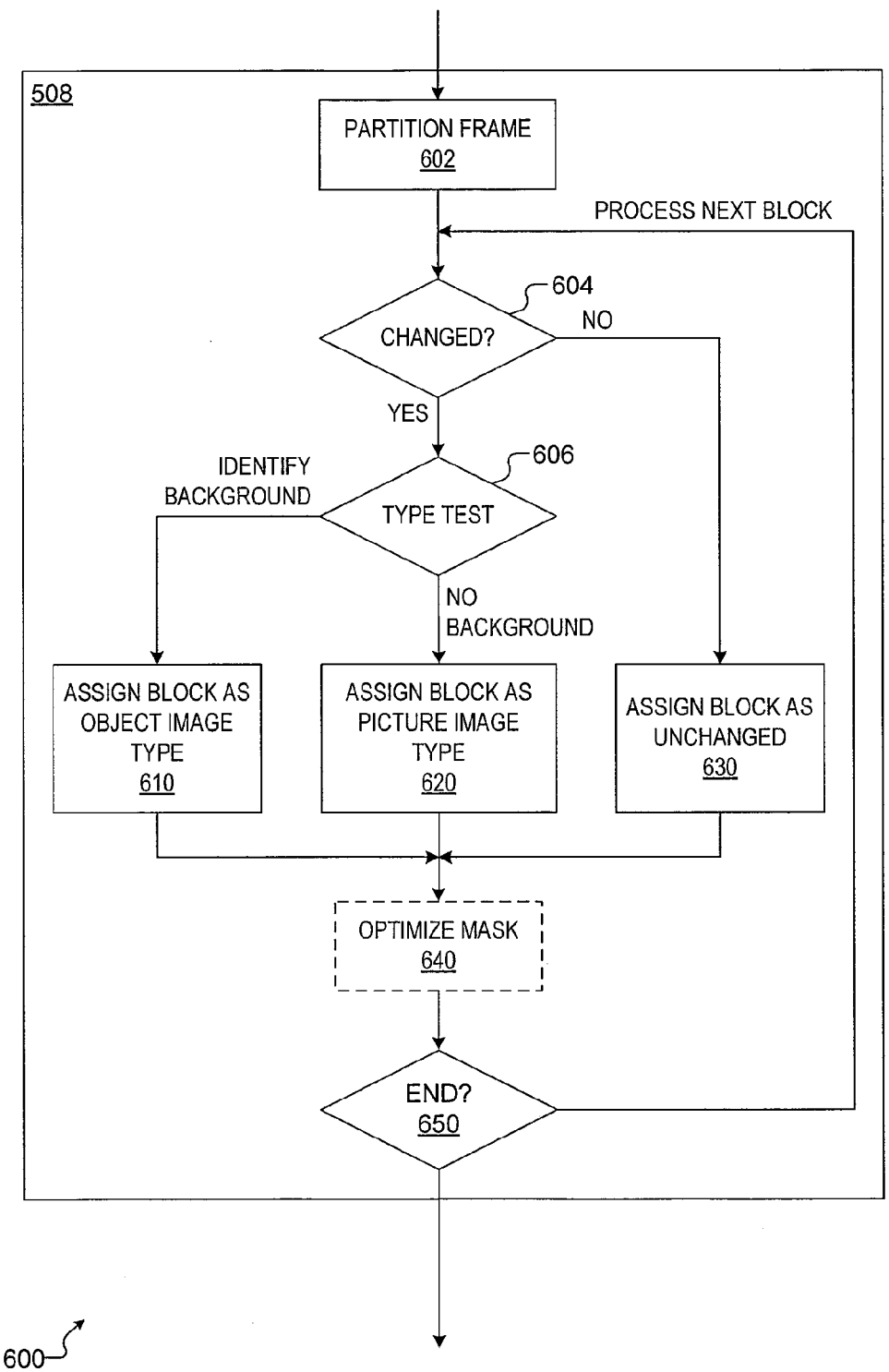
FIG. 6 illustrates an embodiment of a process for generating an image type mask.

FIG. 6 illustrates process 600 comprising an embodiment of step 508 for generating an image type mask. Process 600 starts at step 602 ("Partition Frame") in which the current image frame 252 is partitioned into logical segments, also referred to as image sections or partitioned segments, such as slices, macro-blocks, blocks, rectangles, overlapping windows or a combination thereof. In various embodiments comprising static frame partitioning, step 602 is executed during data structure initialization and need not be repeated.

Process 600 proceeds to step 604 ("Changed?") where the change status, for example as indicated by a pixel change mask of processor sub-system 112, of the next designated partitioned segment (e.g., the next image block in a frame) is checked. If the block is unchanged, it is assigned as unchanged in change mask 450 in step 630 and process 600 proceeds to step 650.

If the block is changed, process 600 proceeds to step 606 ("Type Test") where the image type of the block is determined. The image type may be determined by information 212 provided by processor sub-system 112, or by spatial and temporal pixel-level analysis, including constant color background detection as described or type prediction according to block type history or block type of the surrounding blocks. For example, in an embodiment in which a slice is classified in column order from left to right (and top to bottom order for each column), a block with both west block and north block neighbors previously classified as object type, is itself generally predicted as object type. Blocks identified as object type are assigned (in the image type mask 456) as object image type in step 610. At step 620, changed blocks not comprising object type are assigned as picture image type (in the image type mask 456).

In an embodiment, step 610 further sub-classifies a block of object type into a block of either text type (e.g., document text) or high quality picture type (non-text, e.g., high detail photograph), for example as determined based on hints provided by processor sub-system 112. Text type portions are encoded using lossless encoder 330. In the absence of individual block level control over quantization at video encoder 230, portions comprising high quality picture type may be encoded by lossy encoder 340 (e.g., DWT encoding), typically configured to generate a higher quality lossy image reproduction at client computer 120 than such a block encoded by video encoder 230 while also utilizing less bandwidth for the encoded block than lossless encoder 330.

Process 600 proceeds to optional step 640 ("Optimize Mask") in which image sections (e.g., blocks) are re-classified in order to manage transmission bandwidth, encoded image quality or processing overheads associated with encoding. In one instance, blocks of image frame 252 assigned as picture type (step 620) in one frame, then marked as unchanged (step 630) in a subsequent frame, and then remaining unchanged for a specified duration are designated for an increase in quality (i.e., a "quality update portion" of image frame 252). In one embodiment, such a quality increase is achieved by re-assigning the blocks from the unchanged portion of image frame 252 to the picture portion and increasing the quality of the particular blocks by increasing select quantization settings of the video encoder (i.e., a quality setting related to the lossy encoded content 264) associated with the particular blocks. In another embodiment, such a quality increase is achieved by re-assigning the blocks from the unchanged portion of image frame 252 to the object portion and increasing the quality of the particular blocks by processing the blocks using lossy encoder 340 and/or lossless encoder 330. In another embodiment in which a lossless residual is encoded, a difference calculation is performed between the quality update portion and a reference image, such as video reference image 260, and the resultant difference data is encoded as part of lossless encoded content 262. In a further embodiment, isolated blocks or sections are re-assigned to match the image type of a surrounding area (e.g., using erosion or dilation image processing techniques). Such re-assignment decisions may be biased according to environmental considerations. If reduced network bandwidth utilization is a priority (e.g., a low bandwidth WAN application), re-assignment is biased in favor of changing select blocks from object type to picture type. If optimized image quality is a priority (e.g., a high bandwidth LAN application supporting CAD applications), re-assignment is biased in favor of changing select blocks from picture type to object type.

Process 600 proceeds to step 650 ("End") where a determination is made whether process 600 continues by processing the next image section at step 604 or ending, for example after assignment of all blocks in the frame has completed. If it is determined to end, the process 600 proceeds to step 510 of the process 500.

Figure 7:
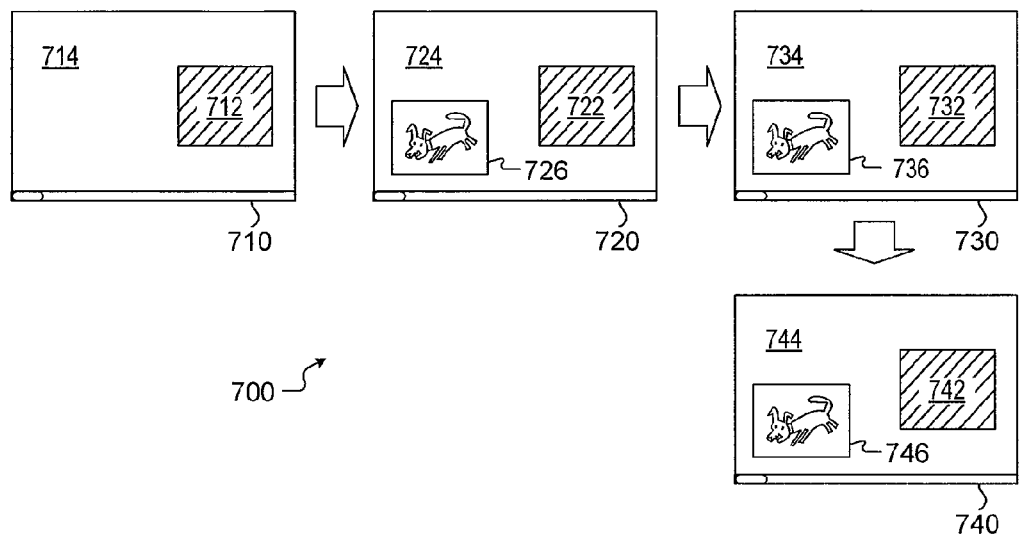
FIG. 7 illustrates a selection of frames from an image sequence provided to illustrate select mask optimization techniques.

FIG. 7 illustrates a selection of frames from an image sequence 700, provided to illustrate select mask optimization techniques. Frame 710, the original (i.e., oldest) frame in sequence 700, is divided into a picture portion 712 (e.g., content displayed by a video player software application) and an object portion 714 (e.g., a constant color background). Image type mask 456, including pixel values for portion 714 for the frame 710 are encoded to generate lossless encoded content 262 for frame 710. A neutral facsimile frame comprising a copy of portion 712 and filled portion 714 (e.g., filled with a neutral color or content from an earlier frame) is encoded to generate lossy encoded content 264 for frame 710.

Frame 720 is a subsequent frame in sequence 700 comprising a changed picture area 722 (e.g., updated content from the video player) and unchanged portion 724, much of which was previously assigned object portion 714. Frame 720 also comprises new (i.e., changed) picture area 726, such as a photograph served by photo display software. Picture areas 722 and 726 are assigned to the picture portion of frame 720. Portion 724 was previously encoded so no additional lossless encoded content 262 is generated for frame 720. The neutral facsimile frame corresponding to frame 720 comprises a copy of picture areas 722 and 726 and filled portion 724 which is ideally filled with corresponding neutral fill from frame 710. The neutral facsimile frame corresponding to frame 720 is encoded to generate lossy encoded content 264 for frame 720.

Frame 730 is a subsequent frame in sequence 700 comprising a changed picture area 732 (e.g., further updated content from the video player), an unchanged area 734 (previously assigned object portion) and picture area 736 unchanged from the corresponding picture area 726 in previous frame 720. Frame 730 is divided into picture portion 732 and an unchanged portion comprising areas 734 and 736 which are filled in the neutral facsimile frame ahead of video encoding.

Frame 740 is a subsequent frame in sequence 700 comprising a changed picture area 742 (e.g., further updated content from the video player), an unchanged area 744 (previously assigned object portion) and unchanged area 746 (previously assigned picture portion). To increase the quality of area 746 (the "quality update portion"), area 746 is moved to the picture portion in conjunction with adjustment of quality settings for video encoder 230 associated with encoding location 746 of frame 740. In an alternative embodiment in which quality settings for video encoder 230 are not locally adjustable (e.g., image quantization control is operable at a frame level rather than a block level), the quality of picture area 746 may be increased in conjunction with re-encoding the frame without simultaneously generating encoded content for area 742. This is accomplished by copying the reference image 260 associated with picture area 732 of frame 730 into the filtered facsimile 258 either before updated video content is available (or in place of updated video content if such content becomes available), performed in conjunction with moving picture area 746 to the picture portion. By adjusting the time duration after which unchanged image areas are re-assigned to picture areas and re-encoding select decoded video reference content, the bandwidth generated by lossy encoded content may be tuned to favor persistent image content over rapidly changing video content.

Figure 8:
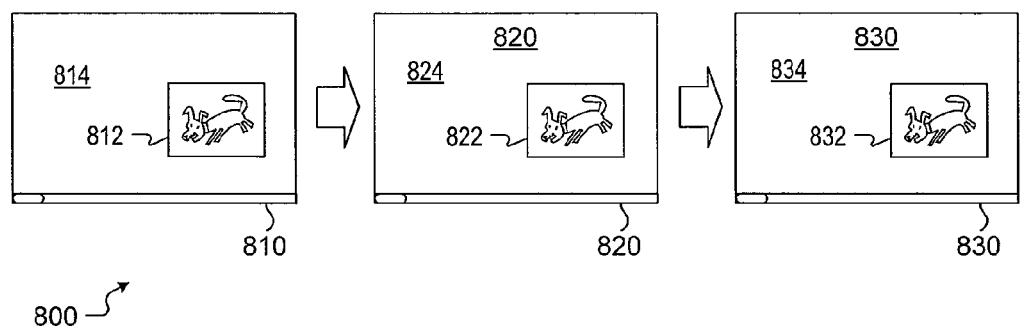
FIG. 8 illustrates a selection of frames from an image sequence provided to illustrate select mask optimization techniques.

FIG. 8 illustrates a selection of frames from an image sequence 800, provided to illustrate select mask optimization techniques. Frame 810, the original frame in sequence 800, is divided into a picture portion 812 and an object portion 814 which is encoded as previously described.

Frame 820 is a subsequent frame in sequence 800 comprising a picture area 822 that is unchanged from corresponding area 812 in frame 810. Picture area 822 is assigned to the unchanged portion, as is area 824 which is also unchanged in the example sequence 800 provided. The entire filtered facsimile associated with frame 820 is filled with neutral data considering no areas of frame 820 are assigned to the picture portion.

Frame 830 is a subsequent frame in sequence 800 comprising an unchanged area 834 (previously assigned object portion) and unchanged area 832 (previously assigned picture portion). To increase the quality of area 832 (the "quality update portion"), area 832 is moved from the unchanged portion to the object portion for further encoding, such as residual or alternative lossless encoding. In a select embodiment, area 832 is assigned to a "high quality picture" (i.e., non-text) sub-set of the object portion (differentiated, for example from another "text" sub-set of the object portion), the high quality picture sub-set subjected to an encoding method such as progressive wavelet encoding or alternative high quality lossy encoding (i.e., non-text lossy content is generated), optionally followed by lossless encoding if the area remains unchanged for a further specified duration.

Figure 9:
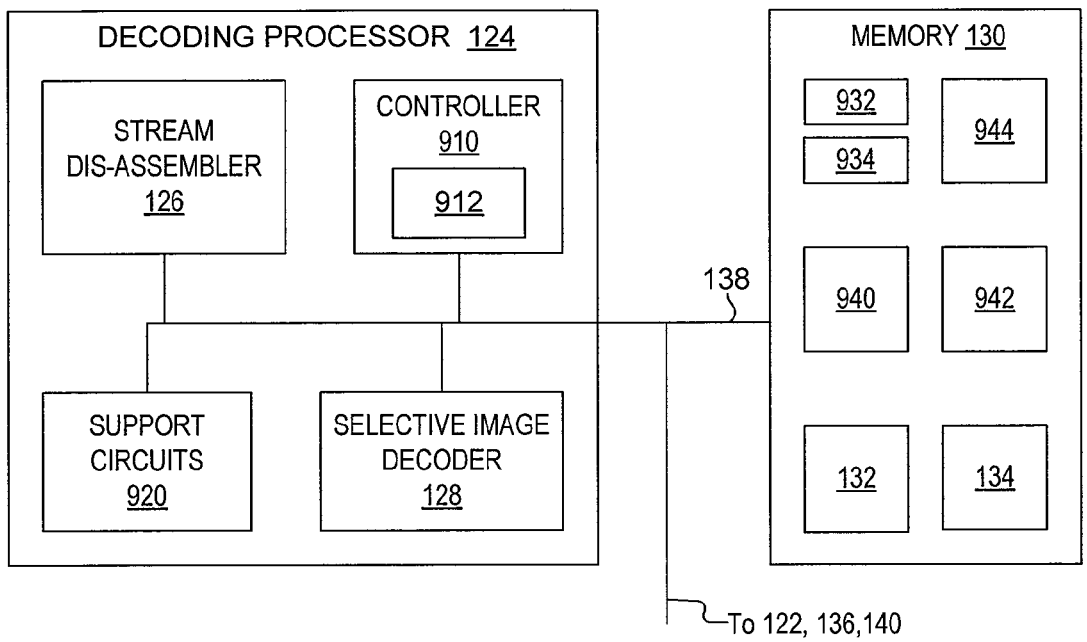
FIG. 9 illustrates selected details of an embodiment of a decoding processor coupled to a memory by a bus.

FIG. 9 illustrates an embodiment of decoding processor 124 coupled to memory 130 by bus 138. According to various embodiments, memory 130 includes one or more of: electronic, magnetic, optical, and/or other types of storage media; volatile computer-readable media, such as RAM, DRAM, and SRAM; and nonvolatile computer-readable media, such as ROM, hard drive, tape, CDROM, DVDROM, magneto-optical disks, EPROM, EEPROM, and Flash EPROM for storage of information such as received network packets, encoded updates, state information, encoded video frames, updated video frames, encoded selective updates, a composite image frame, a client mask and information associated with a controller 910, such as software and/or data used by the controller 910. In further embodiments, memory 130 includes a type of ROM or other non-volatile media used to store software, such as programs or firmware, executed by controller 910. In various embodiments, memory 130 is partitioned and/or distributed into system and frame buffer partitions, wherein the frame buffer partition is accessible by display controller 136. In various embodiments, memory 130 uses different busses for coupling with network interface 122, decoding processor 124, video decoder 140, display controller 136, and/or other components of client computer 120. In further embodiments, memory 130 includes control logic for arbitrating access to memory 130 among the components of client computer 120.

Decoding processor 124 comprises stream dis-assembly, control decoder and support circuit functions for decoding packets received from host computer 110 using decoding methods described herein. In some embodiments, decoding processor 124 is implemented as part of a processor such part of an Application Specific Integrated Circuit (ASIC), Field Programmable Gate Array (FPGA) or embedded processor configured, at least in part, as a logic circuit to perform image decoding; other processors and/or electronic hardware suitable for performing image decoding; and any combination of the foregoing. In other embodiments, decoding processor 124 is implemented, at least in part, as a set of machine executable instructions stored in memory 130 and executed by a processing resource such as a microcontroller, microprocessor or the like of decoding processor 124.

Stream dis-assembler 126, which typically comprises network stack and packet handling facilities, provides a means for disassembling the updates into an encoded video frame, encoded selective image updates and a client mask. Stream dis-assembler 126 further comprises a means for partitioning the composite image frame into a plurality of blocks. In different embodiments, these functions are executed by ASIC, FPGA, machine executable instructions and/or any combination of the foregoing, including controller 910 provided by decoding processor 124. Stream dis-assembler 126 retrieves network packets received by network interface 122 (generally buffered in memory), applies packet re-ordering and extracts the encoded updates 932 from frames comprising encoded content 262 and 264. Lossless encoded content is segregated into lossless encoded image content (e.g., originating from font pixel mask 454) stored as encoded selective image updates 942 and a decoded client mask 944 that identifies the unchanged and object portions of the next frame to be constructed (e.g., originating from change mask 450 and block type mask 452). Lossy encoded content is identified and stored as encoded video frame 940. Video decoder 140 decodes encoded video frame 940 utilizing well known video decoding methods, such as an H.264 HP mode decoding function, and the decoded video image stored as updated video frame 132. Selective image decoder 128, an embodiment of which is depicted in FIG. 10, is enabled to decode the client mask 944 and the encoded selective image updates 942 and update areas of composite image frame 134 indicated by client mask 944 with the decoded selective image updates, typically comprising lossless object image sections.

In an embodiment, controller 910 comprises an embedded processor, such as a microprocessor, a microcontroller, an embedded processor such as a MIPS or ARM processor, alternative logic function configured to manage decoding processor 124 and other elements of client computer 120, including network interface 122 and video decoder 140. Controller 910 provides services related to DMAC configuration, network interface management, selective image decoder management, video decoder management and generation of composite image frame 134. In an embodiment, composition manager 912 is a service executed by controller 910 tasked with compilation of the composite image frame 134, including synchronization of updates applied to the composite image frame and display update timing. In an embodiment, composition manager 912 is enabled to partition composite image frame 134 into image sections (e.g., blocks) and selectively update the blocks according to indicia stored in the client mask 944. Composition manager 912 fills blocks designated for selective image updates (i.e., generally comprising lossless content of object image type) with decoded selective image updates generated by selective image decoder 128, and fills other blocks designated as video data (i.e., generally comprising lossy content of picture image type) with the corresponding blocks copied from the updated video frame 132. In an embodiment that enables the application of selective encoded updates to unchanged picture areas (to provide an increase in image quality, for example), such as depicted by image sequence 800, composition manager 912 provides a means for synchronizing the application of incremental updates (e.g., addition of pixel value differences to identified sections of the composite image frame 134) produced by selective image decoder 128 to follow the timing of initial pixel values copied to the same identified sections of the frame 134, produced by the video decoder 140. One such means comprises circuitry for monitoring write operations from video decoder 140 to frame 134. Another such means comprises synchronization signals such as one or more interrupts or shared synchronization data structures such as mailboxes, registers or flags used to co-ordinate timing of memory access operations, In some embodiments, memory 130 comprises additional state information 934 for accumulating pixel value differences decoded from the encoded selective image updates 942 before such accumulated updates are added to reference frame pixels generated by the video decoder 140.

In select remote computing embodiments, controller 910 also provides management services to enable communications between peripheral devices, such as USB and/or audio devices connected to remote computer 120 and processor sub-system 112. In such a remote computing embodiment, controller 910 may provide a sprite (i.e., a frame buffer overlay) accessible to display controller 136 used to provide local display functions including a locally generated cursor. Support circuits 920 include DMAC resources, timers and interrupt facilities for maintaining synchronization between display controller 136, the selective image decoder 128 and the video decoder 140.

Figure 10:
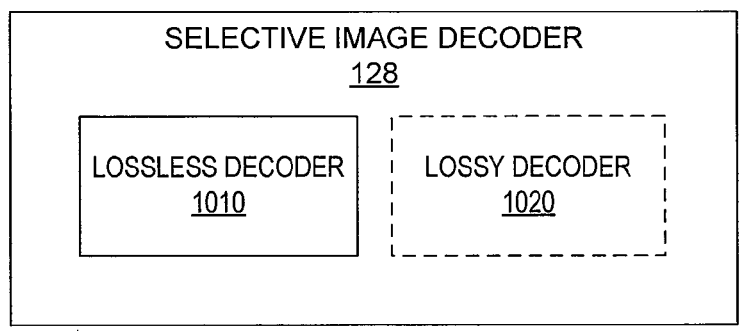
FIG. 10 illustrates selected details of an embodiment of a selective image decoder, comprising a lossless decoder and a lossy decoder which provide reciprocal functions to corresponding lossless and lossy encoders.

FIG. 10 illustrates an embodiment of a selective image decoder 128, comprising lossless decoder 1010 and lossy decoder 1020 which provide reciprocal functions to corresponding encoders 330 and 340. Lossless decoder 1010 comprises at least one of a Golomb decoder, Rice decoder, Huffman decoder, variable length coder (VLC), context-adaptive VLC Lempel-Ziv-Welch (LZW) decoder or context-adaptive binary arithmetic decoder (CABAC)) suited to lossless decoding of lossless encoded content 262, including generation of decoded client mask 944 and decoding of encoded selective image updates 942. In some embodiments, lossless decoder 1010 comprises a read-modify-write function for updating sections, blocks or pixels of composite image frame 134 derived from preceding pixel values at the same location in the composite image frame. In one case, decoder 1010 decodes residual image data or encoded incremental updates and applies the decoded residual image data to a lossy image section of composite image frame 134 by adding residual pixel values to preceding values at determined locations.

Lossy decoder 1020 comprises one or more decoder services such as progressive Discrete Wavelet Transforms (DWT) decoder capabilities (including inverse quantization functions, inverse scaling functions, inverse transform functions and the like) with reciprocal capabilities of lossy encoder 340. In some embodiments, lossy decoder 1020 also comprises a read-modify-write function for updating sections, blocks or pixels of composite image frame 134 with lossy updates.

Figure 11:
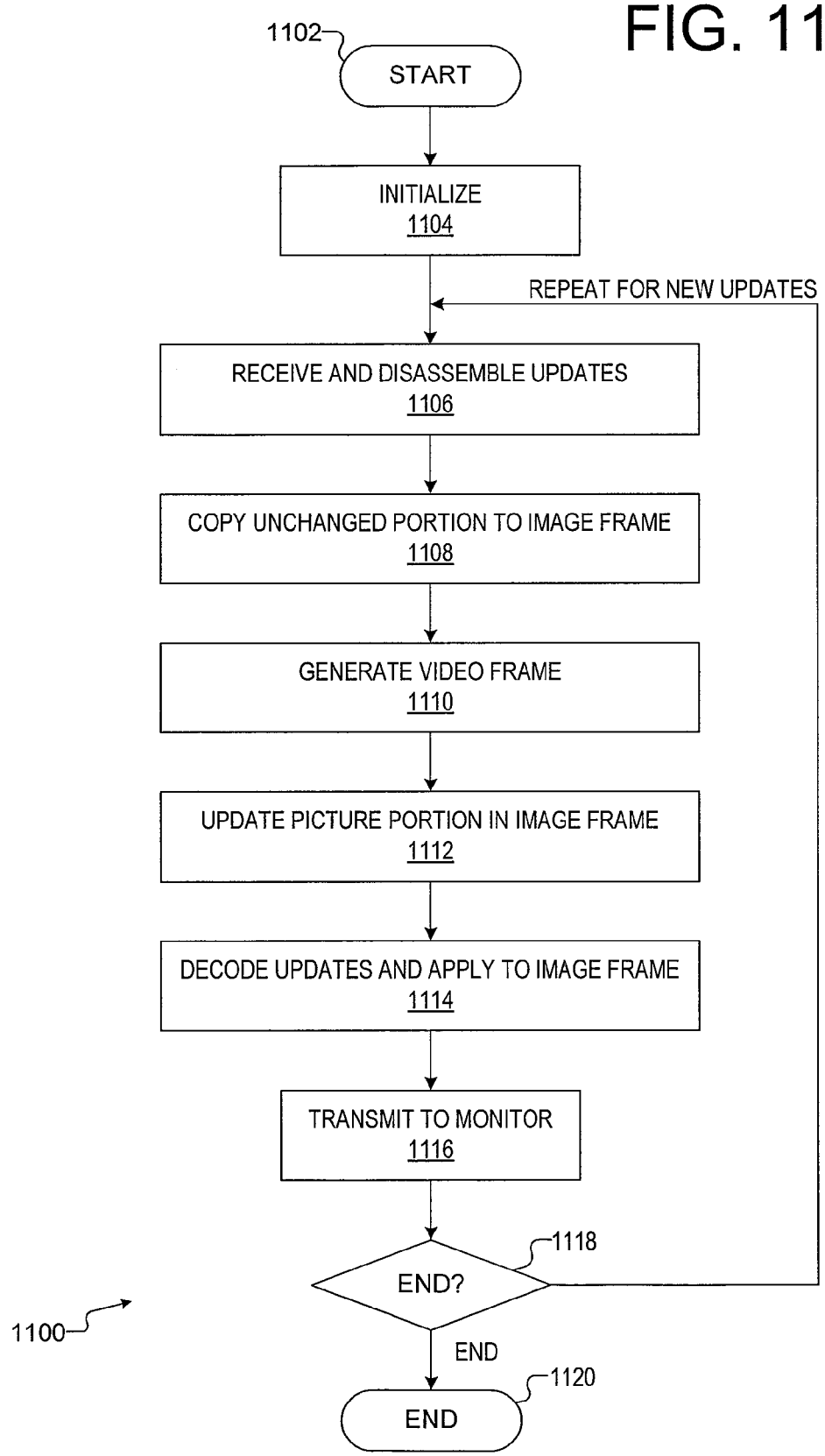
FIG. 11 illustrates an embodiment of a process for decoding an encoded image from a mixed content image sequence.

FIG. 11 illustrates an embodiment of a process 1100 for decoding an encoded image from a mixed content image sequence, process 1100 generally executed under the control of decoding processor 124. Process 1100 starts ("Start" 1102) and proceeds to step 1104 ("Initialize"). According to various embodiments, step 1104 comprises initializing various data structures in memory 130 and negotiating a video decoder profile with encoding processor 114.

Process 1100 proceeds to step 1106 ("Receive and Disassemble Updates") in which an encoded image update is received on network interface 122 and stored as encoded image update 932. Stream dis-assembler 126 of decoding processor 124 dis-assembles the encoded image update 932 into an encoded video frame update 940, encoded selective image updates 942, such as block updates, and a client mask 944.

Process 1100 proceeds to step 1108 ("Copy Unchanged Portion to Image Frame") where an unchanged portion of a previously decoded image frame (e.g., the unchanged portion of a previously generated composite frame 134) is copied to the corresponding location of composite image frame 134, the copy location (associated with the unchanged portion) identified by the client mask 944.

Process 1100 proceeds to step 1110 ("Generate Video Frame") where video decoder 140 generates updated video frame 132 by decoding the encoded video frame update 940. In an embodiment, updated video frame 132 comprises a frame size equal to a native frame size used by display 150 and corresponding frame size defined for client mask 944. In cases where video decoder 140 has limited commodity decoding functionality, the encoded video frame updates may comprise data formats and operations limited to those supported by the H.264 HP profile.

Process 1100 proceeds to step 1112 ("Update Picture Portion in Image Frame") where the composition manager 912 updates the picture portion of the composite image frame 134 identified by the client mask 944 with a corresponding portion from the updated video frame 132. The picture portion of composite image frame 134 corresponds with the picture portion of divided image frame 252.

Process 1100 proceeds to step 1114 ("Decode Updates and Apply to Image Frame") wherein the composition manager 912 updates blocks of the composite image frame 134 with select object image data (i.e., generally lossless image data) generated by selective image decoder 128, as identified by the client mask 944. The select object image data is decoded from encoded selective image updates 942, generally corresponding with the object portion of divided image frame 252. In some embodiments, selective image decoder 128 increments (i.e., 'accumulates') a pixel value generated in a previous decoding operation by an incremental value (i.e., 'a pixel value difference') associated with the corresponding location. The incremental value is decoded from the encoded selective image updates 942.

Process 1100 proceeds to step 1116 ("Transmit to Monitor") in which display controller 136 is engaged to transmit composite image frame 134 to display 150. Process 1100 proceeds to decision step 1118 ("End?") where a determination is made as to whether process 1100 repeats by receiving additional updates at step 1106 or ends at step 1120 ("End"), for example on termination of a remote computing session.

In some embodiments, various combinations of all or portions of functions performed by a computer (such as computer 110 or client computer 120 of FIG. 1), including encoding processor 114 of FIG. 1 and decoding processor 124 of FIG. 1, and portions of a processor, a microprocessor, or a programmable controller providing all or portions of the aforementioned functions, are specified by descriptions compatible with processing by a computer system (e.g., Verilog, VHDL, or any similar hardware description language). In various embodiments the processing includes any combination of interpretation, compilation, simulation, and synthesis to produce, to verify, or to specify logic and/or circuitry suitable for inclusion on an integrated circuit. The integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

The following example embodiments, including at least some explicitly enumerated as "ECs" (Example Combinations), provide additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1. A method for encoding a frame from a mixed content image sequence, the method executed under the control of a processor configured with computer executable instructions, the method comprising: generating, by an encoding processor, an image type mask, the image type mask dividing the frame into an unchanged portion, an object portion and a picture portion; producing lossless encoded content, by the encoding processor, from the object portion and the image type mask; generating, by the encoding processor, a filtered facsimile from the frame, the filtered facsimile generated by retaining the picture portion and further filling the unchanged portion and the text portion with neutral image data; producing, by the encoding processor, lossy encoded content from the neutral facsimile; and transmitting the lossless encoded content and the lossy encoded content.

EC2. The method of EC1, wherein generating the image type mask comprises: partitioning the frame into a plurality of blocks; and assigning ones of the plurality of blocks to one of the unchanged portion, the object portion or the picture portion, based on spatial and temporal analysis of pixel values of the ones of the plurality of blocks.

EC3. The method of EC2, wherein the object portion is divided into a text portion and a high quality picture portion, wherein the high quality picture portion is encoded to produce high quality lossy content.

EC4. The method of EC2, wherein the ones of the plurality of blocks are assigned to the object portion if the ones of the plurality of blocks are changed and at least a threshold quantity of pixels match a color, and wherein ones of the plurality of blocks are assigned to the picture portion if the ones of the plurality of blocks are changed and unassigned to the object portion.

EC5. The method of EC4, wherein encoding the object portion comprises: identifying, for a first block of the plurality of blocks of the object portion, the color and a font pixel mask, the font pixel mask identifying pixels of the first block not matching the color; and encoding the color, the font pixel mask and pixels identified by the font pixel mask to produce a portion of the lossless content.

EC6. The method of EC1, wherein filling the unchanged portion and the object portion with neutral image data comprises selecting fill data for the unchanged portion and the object portion that minimizes the size of the lossy encoded content.

EC7. The method of EC1, wherein filling the object portion with neutral image data comprises filling a sub-portion of the object portion with a color that minimizes the lossless encoded content.

EC8. The method of EC1, wherein filling the unchanged portion with neutral image data comprises filling a sub-portion of the unchanged portion with the image data used in an encoding of a previous frame.

EC9. The method of EC1, wherein filling the unchanged portion with neutral image data comprises, filling a sub-portion of the unchanged portion with an image decoded from a previous encoding of the sub-portion.

EC10. The method of EC9, wherein the producing lossy encoded content comprises utilizing a difference encoder to compute differences between a decoded reference frame and the filtered facsimile.

EC11 The method of EC9, wherein a quality setting of the lossy encoding is increased and the sub-portion of the unchanged portion is selected based on pixels identified as not requiring an increase in encoding quality.

EC11a The method of EC9 comprising adjusting the sub-portion by adjusting a quality setting of the encoding processor, the quality setting determining pixels not requiring an increase in encoding quality.

EC12. The method of EC9, wherein filling the sub-portion comprises masking the sub-portion as unchanged based on information received from a processor sub-system.

EC13. The method of EC1, further comprising: detecting a quality update portion as a portion of the frame (i) previously part of a picture portion of a previous frame and (ii) unchanged for a defined period of time; moving the quality update portion from the unchanged portion to the picture portion; and increasing a quality setting of the encoding processor, the quality setting related to the producing the lossy encoded content.

EC14. The method of EC13, wherein the detecting the quality update portion is performed in conjunction with re-encoding of the frame.

EC15. The method of EC1, further comprising: detecting a quality update portion as a portion of the frame that was (i) part of a picture portion of a previous frame and (ii) has remained unchanged for a defined period of time; and moving the quality update portion from the unchanged portion to the object portion.

EC16. The method of EC15, wherein the producing the lossless encoded content comprises encoding a lossless residual, the lossless residual comprising a difference between a reference image and the quality update portion.

EC17. The method of EC1, wherein the lossy encoded content meets format requirements of an unmasked constant frame size video decoder.

EC18. The method of EC17, wherein the unmasked constant frame size video decoder is an H.264 High Profile (HP) decoder.

EC19. The method of EC1, wherein the encoding processor utilizes a de-blocking filter to produce the lossy encoded content, the de-blocking filter disabled at boundaries of the picture portion.

EC20. An apparatus for encoding a frame from a mixed content image sequence, the apparatus comprising: an image classifier enabled to identify an unchanged image portion, an object portion and a picture portion of the frame; an image processor, the image processor enabled to generate a filtered facsimile of the frame by filling the unchanged portion and the object portion of the lossy image frame copy of the frame with neutral image data, the image processor further enabled to generate a lossless encoding by losslessly encoding the object portion of the image frame and a mask identifying the unchanged portion, the object portion and the picture portion; a video encoder enabled to encode the filtered facsimile to generate an encoded video frame; a memory enabled to store the frame, the filtered facsimile and a previous frame, the previous frame used by the image classifier; and a stream assembler enabled to assemble an encoded image stream comprising a synchronization of the lossless encoding and the encoded video frame.

EC21. A method for decoding an encoded image of mixed content image sequence, the method executed under the control of a decoding processor configured with computer executable instructions, the method comprising: disassembling, by the decoding processor, the encoded image into an encoded video frame update, encoded image block updates and a mask; copying, to an image frame, an unchanged portion of a previously decoded image frame of the mixed content image sequence, the unchanged portion identified by the mask; generating a video frame by decoding the encoded video frame update; updating a video portion of the image frame with a corresponding portion of the video frame, the video portion of the image frame identified by the mask; and updating blocks of the image frame with image data generated by a decoding of the encoded image block updates, the blocks of the image frame identified by the mask.

EC22. The method of EC21, wherein decoding the encoded video frame update comprises decoding the encoded video frame update using a video processor optimized for video decoding and independent of the first processor.

EC23. The method of EC21, wherein generating a video frame comprises generating the video frame with a size equal to a display size of an associated monitor, the display size matching the size of the mask and the size of an associated monitor.

EC24. The method of EC23, wherein the encoded video frame update is limited to operations supported by the H.264 High Profile (HP).

EC25. The method of EC23, further comprising transmitting the image frame to the monitor.

EC26. The method of EC21, wherein the updating the blocks of the image frame comprises accumulating a pixel value difference decoded from the encoded image block updates with a pixel value generated by a previous decoding of a previous encoded video frame update.

EC27. An apparatus for decoding updates to a composite image frame, the apparatus comprising: means for disassembling the updates into an encoded video frame, encoded selective image updates and a client mask; a video decoder enabled to generate an updated video frame by decoding the encoded video frame; a selective image decoder enabled to update a portion of the composite image frame indicated in the client mask by decoding the encoded selective image updates; and means for copying a portion of the updated video frame to the composite image frame in accordance with the client mask.

EC28. The apparatus of EC27 further comprising means for partitioning the composite image frame into a plurality of blocks; and wherein the mask is utilized to identify (i) a first selection of the plurality of blocks designated for a first update by decoding the selective image updates and (ii) a second selection of the plurality of blocks designated for a second update by copying associated blocks from the updated video frame.

EC29. The apparatus of EC27, wherein the video decoder comprises structural optimizations related to video stream processing, the video decoder separated from and controlled by the means for disassembling the updates.

EC30. The apparatus of EC29, wherein the video decoder is structurally optimized for power efficient decoding of a plurality of video stream formats, the plurality of video stream formats comprising 1080p24 H.264 High Profile (HP), the structurally optimized comprising parallel data processing and wherein the video decoder is configured to decode a video stream with a frame size equal to a pixel resolution of a monitor coupled to the apparatus.

EC31. The apparatus of EC27 comprising a function to synchronize updates to the composite image frame, the updates comprising addition of pixel value differences to initial pixel values of the composite image frame, the pixel value differences produced by the selective image decoder, the initial pixel values produced by the video decoder.

EC32. The apparatus of EC27, further comprising a display controller enabled to transmit the composite image frame to a display.

EC33 A system for communicating an image frame of mixed content from a host to a display at a client, the system comprising: a lossy image frame communication system comprising, a lossy video encoder at the host, coupled, via an Internet Protocol (IP) network, to a video decoder at the client, the lossy image frame communication system enabled to communicate a lossy image frame with a display resolution of the display; a lossless image block communication system comprising, a lossless image block encoder at the host, coupled, via the IP network, to a block image decoder at the client, the lossless image block communication system enabled to communicate a selection of block images; wherein a mask, generated at the host, defines (i) a portion of the image frame to be filled with neutral image data before transferring, by the lossy image frame communication system, and (ii) a portion of a client image frame to be updated by a corresponding portion of the lossy image frame communicated by the lossy image frame communication system; and wherein the mask defines the selection of blocks of the image frame to be communicated by the block communication system and defines corresponding blocks of the client image frame to be update by blocks communicated by the lossless image block communication system.

While the foregoing is directed to embodiments of the present invention, other and further embodiments of the invention may be devised without departing from the basic scope thereof, and the scope thereof is determined by the claims that follow.

The invention claimed is:

1. A method for encoding a sequence of frames from a mixed content image sequence, the method executed under the control of a processor configured with computer executable instructions, the method comprising:

generating, by an encoding processor, an image type mask that divides a pixel image frame of the sequence of frames into (i) a first unchanged portion, wherein the first unchanged portion is previously lossy encoded and comprises pixel values unchanged from a specified plurality of previous frames of the sequence of frames, (ii) a first portion that has changed and requires lossless compression, (iii) a second portion that has changed and requires lossy compression and (iv) a second unchanged portion comprising pixel values unchanged from a previous frame of the sequence of frames and exclusive of the first unchanged portion;

producing lossless encoded content, by the encoding processor, of the first portion, the first unchanged portion and the image type mask;

generating, by the encoding processor, a filtered image of the pixel image frame, the filtered image retaining the second portion and identifying the first unchanged portion and the first portion; and producing, by the encoding processor, from the filtered image, lossy encoded content of the pixel image frame by referencing a decoding of lossy encoded content of a previous pixel image frame of the sequence of frames, wherein generating the image type mask comprises partitioning the pixel image frame into a plurality of blocks; and wherein a block of the plurality of blocks is (a) assigned to the first portion if pixel value of the block is changed and at least a threshold quantity of pixels within the block comprise a matching color, and (b) assigned to the second portion if the pixel value of the block is chanced and unassigned to the first portion; and wherein producing the lossless encoded content of the first portion comprises: (1) identifying, for a first block of a plurality of blocks of the first portion, the matching color and a font pixel mask, the font pixel mask identifying pixels of the first block not comprising the matching color; and (2) encoding the matching color, the font pixel mask, and colors of pixels identified by the font pixel mask to produce a portion of the lossless encoded content; and wherein the size of the lossy encoded content is smaller than a size of an encoding of the pixel image frame and wherein a decoding of the lossy encoded content generates a common image quality, for the second portion, as a decoding of the encoding of the pixel image frame.

2. The method of claim 1, wherein the plurality of blocks is oriented to blocks used by the encoding processor to encode an H.264 video and wherein generating the image type mask comprises:

assigning each block of the plurality of blocks, based on spatial and temporal analysis of pixel colors of the each block, to one of the first unchanged portion, the first portion, the second portion or the second unchanged portion.

3. The method of claim 2, wherein the first portion is divided into a text portion and a non-text portion, and wherein the non-text portion is removed from the first portion and encoded to produce non-text lossy content.

4. The method of claim 1, wherein identifying the first unchanged portion and the first portion comprises providing a skip indication or single color fill data to a lossy encoder, of the encoding processor, for the first unchanged portion and the first portion.

5. The method of claim 1, wherein identifying the first portion comprises filling a sub-portion of the first portion with a color that minimizes a size of the lossy encoded content.

6. The method of claim 1, wherein identifying the first unchanged portion comprises filling a sub-portion of the first unchanged portion with image data used in an encoding of the previous frame of the sequence of frames.

7. The method of claim 1, wherein identifying the first unchanged portion comprises filling a sub-portion of the first unchanged portion with an image decoded from a previous encoding of the sub-portion.

8. The method of claim 1, wherein identifying the first unchanged portion comprises adjusting an encoding parameter for a portion of the first unchanged portion, the encoding parameter selected to skip processing a portion of blocks of the lossy encoded content.

9. The method of claim 1, further comprising:
detecting a quality update portion as a portion of the pixel image frame (i) as a previously changed portion of an earlier frame that required lossy encoding and (ii) unchanged, subsequent to the earlier frame, for a defined period of time;
identifying the quality update portion as part of the second portion; and
increasing a quality setting, of the encoding processor, for the quality update portion, the quality setting related to producing the lossy encoded content.

10. The method of claim 1, further comprising:
detecting a quality update portion as a portion of the pixel image frame that was (i) part of a picture portion of the previous frame and (ii) has remained unchanged for a defined period of time; and
moving the quality update portion from the first unchanged portion to the first portion.

11. The method of claim 1, wherein the lossy encoded content is encoded so as to be decodable by a maskless constant frame size video decoder available on a consumer computer, the maskless constant frame size video decoder optimized for decoding standards based videos on the consumer computer.

12. A method for decoding an encoded image sequence, the method executed under the control of a decoding processor configured with computer executable instructions, the method comprising:

disassembling, by the decoding processor, a portion of the encoded image sequence into (i) a stream portion of an encoded video stream, (ii) encoded selective image updates, and (iii) a mask, the mask identifying an assembly of an image frame from unchanged portions of a decoding of a previous instance of encoded selective image updates and a decoding of a previous portion of the encoded video stream, a lossy decoded portion from a decoded frame of the encoded video stream, and a losslessly decoded portion from a decoding of the encoded selective image updates;

copying, by the decoding processor, the unchanged portions to the image frame;

communicating, by the decoding processor, via hardware communication bus, to a motion video decoder physically separate and asynchronous to the decoding processor, the encoded video stream;

decoding, by the motion video decoder, the encoded video stream, using reference frames generated as part of decoding the encoded video stream, to generate a sequence of video frames equal in size to the image frame, wherein the decoding of a first portion of the encoded video stream aligned with the encoded selective image updates generates undisplayed image content, the first portion comprising at least one of encoding parameters or encoded images reduced in quality from a remaining portion of the encoded video stream associated with the image frame;

identifying, by the decoding processor, a video frame, of the sequence of video frames, associated with the encoded selective image updates, wherein identifying the video frame comprises performing a synchronizing operation between the motion video decoder and the decoding processor;

copying, by the decoding processor, to the image frame, a portion of the video frame identified by the mask;

writing, by the decoding processor, sections of the image frame with image data decoded by the decoding processor from the encoded selective image updates, the sections of the image frame identified by the mask, the encoded selective image updates comprising an encoding of a background color, a plurality of losslessly encoded pixel colors and a pixel mask identifying the location of each of the plurality of losslessly encoded pixel colors; and displaying, by a display controller, the image frame, wherein copying the unchanged portions, copying the portion of the video frame and writing the sections are synchronized, by the decoding processor, with a display update timing of the display controller and an availability of the video frame within the sequence of video frames.

13. The method of claim 12, wherein the motion video decoder decodes constant frame size motion compensated video content and is independent of the decoding processor, and wherein the motion video decoder operates in a YUV color format and the decoding processor operates in RGB color format.

14. The method of claim 12, wherein writing the sections of the image frame comprises accumulating a pixel value difference, decoded from the encoded selective image updates, with a pixel value generated by a previously decoded, YUV formatted, video frame update of the sequence of video frames to generate a lossless reproduction of a source image encoded, in an RGB color space, as part of the encoded image sequence.

15. An apparatus for decoding composite image streams, the apparatus comprising:

means for disassembling a portion of an encoded image sequence into (i) a stream portion of an encoded video stream, (ii) encoded selective image updates and (iii) a mask, the mask identifying an assembly of a composite image frame from an unchanged portion of a decoding of a previous instance of encoded selective image updates, a lossy decoded portion from a decoded frame of the encoded video stream, an unchanged portion of a decoding of a previous portion of the encoded video stream, and a losslessly decoded portion from a decoding of the encoded selective image updates;

a selective image decoder enabled to update, by decoding the encoded selective image updates, a first portion, of the composite image frame, indicated by the mask, wherein updating the first portion comprises replacing first pixels, of the first portion, with pixel values decoded from lossless encoded format pixels, wherein the encoded selective image updates comprise an encoding of a background color, a plurality of losslessly encoded pixel colors and a pixel mask identifying the location of each of the plurality of losslessly encoded pixel colors;

the lossy motion video decoder, distinct from the means for disassembling and the selective image decoder, enabled to generate a sequence of video frames, equal in size to the composite image frame, by decoding the encoded video stream using motion-compensated reference images decoded by the lossy motion video decoder, wherein the decoding of a first portion of the encoded video stream aligned with the encoded selective image updates generates undisplayed image content, the first portion comprising at least one of encoding parameters or encoded images reduced in quality from a remaining portion of the encoded video stream associated with the composite image frame;

means for copying, distinct from the lossy motion video decoder, a portion of a video frame, of the sequence of video frames, to the composite image frame based on (a) the mask, (b) identifying the video frame within the sequence of video frames and (c) identifying a completion of a decoding of the video frame by the lossy motion video decoder;

means for identifying, from the sequence of video frames, the video frame; and means for identifying the completion of the decoding of the video frame.

16. The apparatus of claim 15 further comprising means for partitioning the composite image frame into a plurality of blocks; wherein the mask is utilized to identify (i) a first selection of blocks in the plurality of blocks designated for a first update that comprises a decoding of the encoded selective image updates and (ii) a second selection of blocks in the plurality of blocks designated for a second update that comprises copying blocks from the video frame.

17. The apparatus of claim 15, wherein the lossy motion video decoder comprises structural optimizations for power efficient decoding of a plurality of video stream formats, the plurality of video stream formats comprising 1080p24 H.264 High Profile, the structural optimizations comprising an image transform block and an entropy decoder, and wherein the lossy motion video decoder is configured to decode a video stream with a frame size equal to a pixel resolution of a monitor used to display the composite image frame.

18. The apparatus of claim 15 further comprising a means for synchronizing incremental updates applied to the composite image frame, the incremental updates comprising addition of pixel value differences to initial pixel values of the composite image frame, the pixel value differences produced by the selective image decoder, the initial pixel values produced by the lossy motion video decoder.

\* \* \* \* \*